(12) United States Patent
Yasuda et al.

(10) Patent No.: US 11,762,394 B2
(45) Date of Patent: Sep. 19, 2023

(54) POSITION DETECTION APPARATUS, POSITION DETECTION SYSTEM, REMOTE CONTROL APPARATUS, REMOTE CONTROL SYSTEM, POSITION DETECTION METHOD, AND PROGRAM

(71) Applicant: NEC Corporation, Tokyo (JP)

(72) Inventors: Shinya Yasuda, Tokyo (JP); Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 317 days.

(21) Appl. No.: 17/287,851

(22) PCT Filed: Oct. 30, 2019

(86) PCT No.: PCT/JP2019/042596
§ 371 (c)(1),
(2) Date: Apr. 22, 2021

(87) PCT Pub. No.: WO2020/090897
PCT Pub. Date: May 7, 2020

(65) Prior Publication Data
US 2021/0382496 A1     Dec. 9, 2021

(30) Foreign Application Priority Data
Nov. 1, 2018   (JP) ................................. 2018-206697

(51) Int. Cl.
*G05D 1/02* (2020.01)
*G06T 7/12* (2017.01)
(Continued)

(52) U.S. Cl.
CPC ......... *G05D 1/0274* (2013.01); *G05D 1/0219* (2013.01); *G05D 1/0246* (2013.01);
(Continued)

(58) Field of Classification Search
CPC .. G05D 1/0274; G05D 1/0219; G05D 1/0246; G06T 5/009; G06T 5/20;
(Continued)

(56) References Cited

U.S. PATENT DOCUMENTS

| | | |
|---|---|---|
| 2004/0101162 A1 | 5/2004 | Higaki et al. |
| 2020/0265601 A1 | 8/2020 | Uchida |
| 2021/0166426 A1* | 6/2021 | McCormac ............. G06T 7/579 |
| 2021/0207943 A1* | 7/2021 | Fujiwara ................... G06T 7/62 |

FOREIGN PATENT DOCUMENTS

| | | | |
|---|---|---|---|
| JP | H10185518 A | 7/1998 | |
| JP | 2004133567 A * | 4/2004 | ........... G05D 1/0246 |

(Continued)

OTHER PUBLICATIONS

International Search Report of PCT Application No. PCT/JP2019/042596 dated Dec. 24, 2019.

*Primary Examiner* — Chan S Park
*Assistant Examiner* — Daniel C Chang
(74) *Attorney, Agent, or Firm* — Sughrue Mion, PLLC

(57) ABSTRACT

A position detection apparatus comprises: a map information creation part that creates map information representing a position in a space including a floor surface on which at least one detection object may be disposed; a mask information creation part that creates mask information, by extracting a region of a predetermined height range within a height range from the floor surface when the detection object is disposed in the space from the map information; a specifying part that specifies partial optical image information, by removing a region corresponding to the mask information from the optical image information; and a detection part that specifies a positional relationship between the map information and the partial optical image information at a pixel level, and detects a position of the detection object in the map information based on the specified positional relationship.

20 Claims, 14 Drawing Sheets

(51) Int. Cl.
  *G06T 7/70* (2017.01)
  *G06T 5/00* (2006.01)
  *G06T 5/20* (2006.01)

(52) U.S. Cl.
  CPC .............. *G06T 5/009* (2013.01); *G06T 5/20* (2013.01); *G06T 7/12* (2017.01); *G06T 7/70* (2017.01); *G06T 2207/30252* (2013.01); *G06V 2201/07* (2022.01)

(58) Field of Classification Search
  CPC ... G06T 7/12; G06T 7/70; G06T 2207/30252; G06T 2207/10012; G06T 2207/30112; G06T 7/11; G06T 7/136; G06T 7/73; G06V 2201/07; G01B 11/00
  See application file for complete search history.

(56) References Cited

FOREIGN PATENT DOCUMENTS

| | | |
|---|---|---|
| JP | 2004301607 A | 10/2004 |
| JP | 4042517 B2 | 2/2008 |
| JP | 2010160056 A | 7/2010 |
| JP | 2011106829 A | 6/2011 |
| JP | 2011134234 A | 7/2011 |
| JP | 2011253377 A | 12/2011 |
| JP | 2013024735 A | 2/2013 |
| JP | 2015123534 A | 7/2015 |
| JP | 2018096716 A | 6/2018 |
| JP | 2018146347 A | 9/2018 |
| WO | 0223122 A1 | 3/2002 |

* cited by examiner

[MAP INFORMATION]

POSITION DETECTION APPARATUS, POSITION DETECTION SYSTEM, REMOTE CONTROL APPARATUS, REMOTE CONTROL SYSTEM, POSITION DETECTION METHOD, AND PROGRAM

This application is a National Stage Entry of PCT/JP2019/042596 filed on Oct. 30, 2019, which claims priority from Japanese Patent Application 2018-206697 filed on Nov. 1, 2018, the contents of all of which are incorporated herein by reference, in their entirety.

FIELD

Description of Related Application

The present invention is based on claiming priority of Japanese Patent Application: JP2018-206697 (filed on Nov. 1, 2018), the entire contents of this application shall be incorporated and stated in the present application by reference thereto.

The present invention relates to a position detection apparatus, a position detection system, a remote control apparatus, a remote control system, a position detection method, and a program.

BACKGROUND

In recent years, along with efficiency, standardization, and labor saving of logistics business, in warehouses and factories, transporting tends to be performed by using a mobile body (transport robot, transport vehicle, etc.) that can be remotely controlled, a transport object (for example, push car, luggage, etc.). In performing a transport work by remotely controlling the mobile body, it is extremely important to accurately detect a position of a detection object (mobile body, transport object, etc.). As a technique for accurately detecting a position of a detection object, for example, there are the following techniques.

Patent Literature (PTL) 1 discloses a technique, wherein positioning (position measurement) of a transport object is enabled by attaching a barcode or QR (Quick Response; registered trademark) code to the transport object (object), and shooting the barcode or QR code by a camera (shooting part). According to the technique of PTL 1, a three-dimensional position and three-axes angles of the barcode can be determined by extracting four or more points of interest from an image of the barcode.

PTLs 2 and 3 disclose a technique, wherein light emitting bodies (light emitting parts, light emitting means) are provided on a mobile body (movable object); and the mobile body is positioned (position-detected) by shooting the light emitting body from a position where the light emitting body is overlooked, using a camera (stereo camera, imaging means). According to the techniques of PTL 2 and 3, a position and a posture of the mobile body can be detected by emitting light at different wavelengths from each of the plurality of light emitting bodies provided in one mobile body.

PTL 4 discloses a technique, wherein an obstacle on a path of a mobile body is detected, using a plurality of distance sensors fixed to a ceiling and a side. In the technique of PTL 4, using a distance sensor disposed on the ceiling, a place within a range where a depth value (height) from the ceiling is constant is determined as a floor surface, and it is determined that there is an obstacle at a place outside the range. Similarly to PTL 4, PTLs 5 to 7 disclose a technique, wherein a position is detected by extracting a portion within a specific height range from a depth value (height, distance).

PTL 8 discloses a technique, wherein a position of a mobile body is acquired as a displacement from a marker by shooting a ceiling surface, using a camera (imaging apparatus) provided on the mobile body, and recognizing the marker (teaching position) disposed on the ceiling. In the technique of PTL 8, a binocular camera is used as the camera. By using the binocular camera, a distance to an entity-to-be-imaged can be recognized based on a parallax of two images. Also, according to the technique of PTL 8, by using a distance mask obtained by extracting a portion of pixels having a distance close to the ceiling distance determined in advance; and a brightness mask composed of pixels excluding pixels having too high brightness, the recognition accuracy of the disposed marker(s) is improved. Further, according to the technique of PTL 8, by creating a mask image using not only the ceiling distance (depth value) but also the brightness information, the accuracy can be improved, and since a temporal fluctuation of the brightness information in the optical image is small, usually, the brightness information can be acquired more stably than the ceiling distance.

[PTL 1] JP2010-160056A
[PTL 2] JP2013-24735A
[PTL 3] WO2002/023122A1
[PTL 4] JP2011-253377A
[PTL 5] JP2018-146347A
[PTL 6] JP2018-96716A
[PTL 7] JP2011-106829A
[PTL 8] JP4042517B2

SUMMARY

The following analysis is given by the inventors of the present application.

However, in a mobile body that is remotely controlled based on a detection position, if an error in the detection position is large, even if a control algorithm of the mobile body is excellent, there is a possibility that a transport work performed by remotely controlling the mobile body would fail.

Also, in a case where the remotely controlled mobile body moves by using wheels, if a number of rotations of the wheels is measured by using an encoder, a relative position from a moving start point of the mobile body can be theoretically obtained, however, it is not possible to move at high precision only by the number of rotations. This is because errors that cannot be recognized by internal sensors of the mobile body, such as unevenness of a road surface, wear of the wheels, individual difference of a motor(s) that is a power source of the wheel(s), and the like, accumulate over time.

Further, when transporting a push car, using a remotely controlled mobile body, although it is necessary to detect a position of the push car, since a normal push car does not have a power supply or motive power, it is necessary to modify by adding a sensor such as an encoder, or to detect a position of the push car from outside of the push car. Furthermore, since there are many push cars and the push cars are not expected to be modified, in reality, there is no choice but to select to detect a position of a push car from the outside.

As to the technique of PTL 1, it is necessary to attach a barcode or QR code to all articles for which position detection is desired. This complicates transportation, for example, when detecting transport objects in a warehouse where a large amount of different transport objects are received every day. Also, in an experiment by the applicant who recognizes the QR code printed on A4 paper from a camera image using an open source library ZBar, the QR code cannot be recognized if the distance is about 2.5 m (meters). For this reason, there is a possibility that detection missing occurs in the position detection using an overlooked image from the ceiling height, in general.

As to the techniques of PTLs 2 and 3, although it is necessary that a mobile body is provided with a light emitting body, in a case where a camera be disposed on a push car having no power supply or the like instead of the mobile body, it is necessary either to modify the push car or to detect a position of the push car from outside of the push car.

As to the techniques of PTLs 4 to 7, in a position detection using a depth value (height, distance), since it is not possible to correctly separate a plurality of adjacent mobile bodies, it is difficult to separate/distinguish correctly only the mobile body that position detection is desired based on the depth value.

As to the technique of PTL 8, since a camera must be provided on the mobile body as a measure object, in a case where a camera be disposed on a push car having no power supply or the like instead of a mobile body, it is necessary to modify the push car or detect a position of the push car from outside of the push car similarly to the techniques of PTLs 2 and 3. Also, in the technique of PTL 8, since information is acquired from the mobile body in a fashion (state) of looking up at a marker disposed on a ceiling, a luggage cannot be placed on an upper part of the mobile body. Further, in the technique of PTL 8, since each of the plurality of moving bodies independently detects its own position, a single mobile body cannot know their positional relationship when a plurality of moving bodies exist.

It is a main object of the present invention to provide a position detection apparatus, a position detection system, a remote control apparatus, a remote control system, a position detection method, and a program that can contribute to accurately detecting a position of a detection object.

A position detection apparatus according to a first aspect comprises: a map information creation part that creates map information representing a position in a space including a floor surface on which at least one detection object may be disposed, the position corresponding to each of pixels configuring optical image information representing an imaged image of at least the space, the optical image information being generated by an imaging apparatus imaging the space; a mask information creation part that creates mask information, using map information, by extracting a region of a predetermined height range within a height range from the floor surface when the detection object is disposed in the space from the map information; a specifying part that specifies partial optical image information, using the optical image information and the mask information, by removing a region corresponding to the mask information from the optical image information; and a detection part that specifies a positional relationship between the map information and the partial optical image information at a pixel level, using the map information and the partial optical image information, and detects a position of the detection object in the map information based on the specified positional relationship.

A position detection system according to a second aspect comprises: an imaging apparatus that images a space including a floor surface on which at least one detection object may be disposed; and a position detection apparatus according to the first aspect, wherein the imaging apparatus is communicatably connected to the position detection apparatus.

A remote control apparatus according to a third aspect comprises: a position detection apparatus according to the first aspect; a communication part that enables communication with a mobile body and an imaging apparatus; and a control part that controls an operation of the mobile body via the communication part based on information related to a position of the mobile body that is a detection object detected by the position detection apparatus.

A remote control system according to a fourth aspect comprises: at least one mobile body as a detection object; an imaging apparatus that images a space including at least a part of a range in which the mobile body moves; a remote control apparatus according to the third aspect; and a network that communicatably connects the imaging apparatus, the remote control apparatus, and the mobile body.

A position detection method according to a fifth aspect comprises: creating map information representing a position in a space including a floor surface on which at least one detection object may be disposed, the position corresponding to each of pixels configuring optical image information representing an imaged image of at least the space, the optical image information being generated by an imaging apparatus imaging the space; creating mask information, using map information, by extracting, from the map information, a region of a predetermined height range within a height range from the floor surface when the detection object is disposed in the space; specifying partial optical image information, using the optical image information and the mask information, by removing a region corresponding to the mask information from the optical image information; and specifying a positional relationship between the map information and the partial optical image information at a pixel level, using the map information and the partial optical image information, and detecting a position of the detection object in the map information based on the specified positional relationship.

A program according to a sixth aspect causes hardware resources to execute processings comprising: creating map information representing a position in a space including a floor surface on which at least one detection object may be disposed, the position corresponding to each of pixels configuring optical image information representing an imaged image of at least the space, the optical image information being generated by an imaging apparatus imaging the space; creating mask information, using map information, by extracting, from the map information, a region of a predetermined height range within a height range from the floor surface when the detection object is disposed in the space; specifying partial optical image information, using the optical image information and the mask information, by removing a region corresponding to the mask information from the optical image information; and specifying a positional relationship between the map information and the partial optical image information at a pixel level, using the map information and the partial optical image information, and detecting a position of the detection object in the map information based on the specified positional relationship.

The program can be recorded on a computer-readable storage medium. Also, the storage medium storing the program may be a non-transitory, such as a semiconductor memory, a hard disk, a magnetic recording medium, or an optical recording medium. Also, in the present disclosure, it is also possible to implement it as a computer program product. The program is input to a computer apparatus from an input device or from outside via a communication interface; is stored in a storage device; causes a processor to drive according to predetermined steps or processings; can cause to display processing results thereof, including an intermediate state via a display device step by step as necessary; or can cause to communicate with outside via a communication interface. The computer apparatus for that purpose typically comprises: for example, a processor; a storage device; an input device; a communication interface; and, if necessary, a display device, that can be connected to each other via a bus.

According to the first to sixth aspects, it is possible to contribute to accurately detecting a position of a detection object.

PREFERRED MODES

Figure 1:
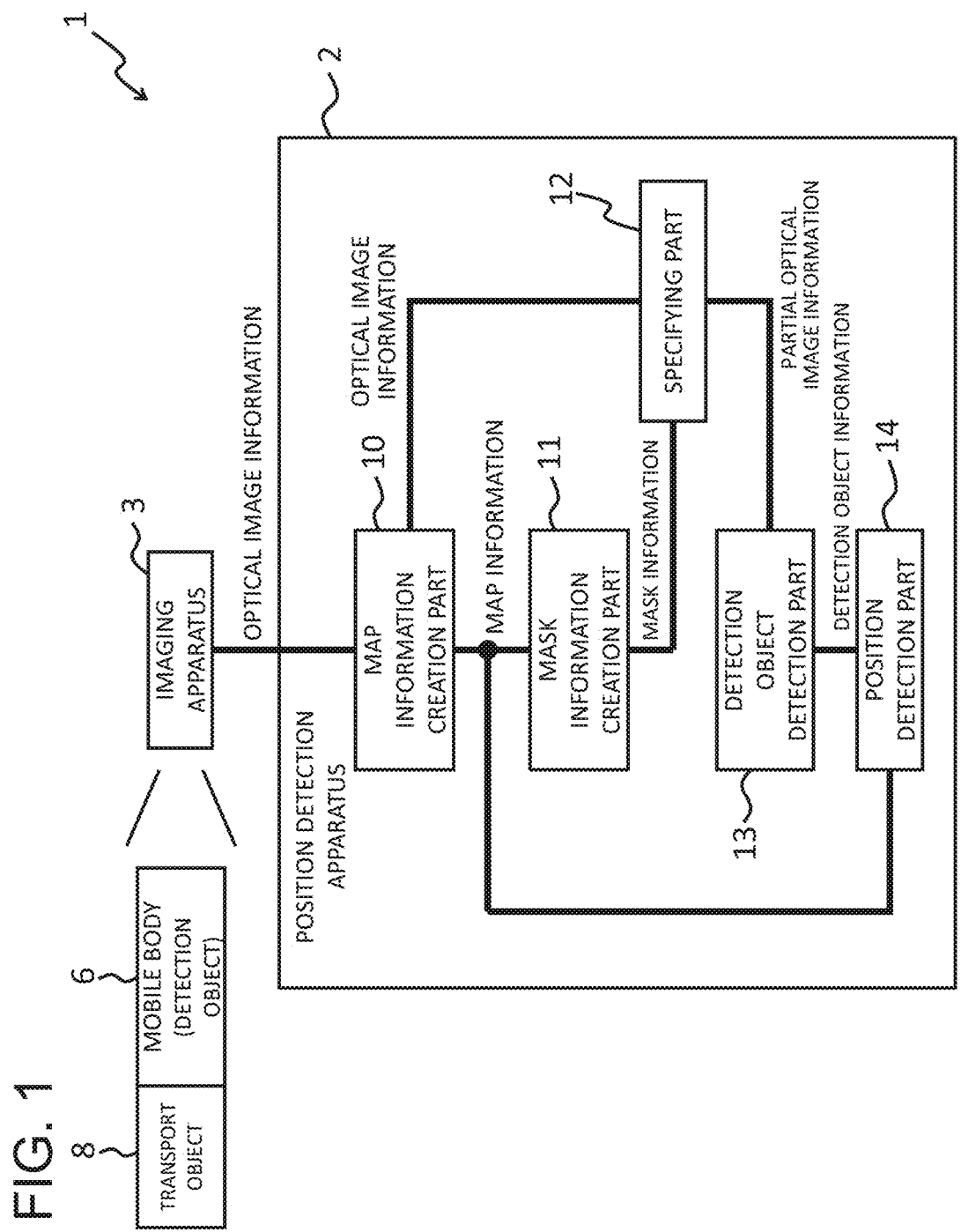
FIG. 1 is a block diagram schematically showing a configuration of a position detection system according to a first exemplary embodiment.

In the present disclosure described below, a position detection apparatus according to a mode 1 and its modification mode or modes (termed herein cumulatively as "mode(s)") can be appropriately selected and combined.

As the position detection apparatus according to the mode 1, the position detection apparatus can comprise a map information creation part that creates map information representing a position in a space including a floor surface on which at least one detection object may be disposed, the position corresponding to each of pixels configuring optical image information representing an imaged image of at least the space, the optical image information being generated by an imaging apparatus imaging the space. The position detection apparatus can comprise a mask information creation part that creates mask information, using map information, by extracting a region of a predetermined height range within a height range from the floor surface when the detection object is disposed in the space from the map information. The position detection apparatus can comprise a specifying part that specifies partial optical image information, using the optical image information and the mask information, by removing a region corresponding to the mask information from the optical image information. The position detection apparatus can comprise a detection part that specifies a positional relationship between the map information and the partial optical image information at a pixel level, using the map information and the partial optical image information, and detects a position of the detection object in the map information based on the specified positional relationship.

As a modification mode of the position detection apparatus according to the mode 1, the detection part can comprise: a detection object detection part that executes a predetermined image processing to the partial optical image information, using the partial optical image information and detects a contour of the detection object from the partial optical image information that has been subjected to the predetermined image processing; and a position detection part that detects a position of the contour of the detection object in the map information, using the map information and information related to the contour of the detection object. As a modification mode of the position detection apparatus according to the mode 1, the map information creation part can create the map information, using the optical image information generated by the imaging apparatus. Also, in the position detection apparatus, the map information creation part can create the map information, using information related to a distance measured by a distance sensor that measures a distance from the distance sensor itself to an entity-to-be-imaged including the detection object. Also, the position detection apparatus can further comprise a map correction part that corrects the map information so that an angle of view by the imaging apparatus is vertically downward with respect to the map information, wherein the mask information creation part creates the mask information, using the map information corrected by the map correction part. Also, the position detection apparatus can further comprise an optical image correction part that corrects brightness or hue accompanying peripheral darkening in the optical image information, wherein the specifying part specifies the partial optical image information, using the optical image information corrected by the optical image correction part. Also, in the position detection apparatus, the predetermined image processing in the detection object detection part can comprise executing a binarization processing in which only pixels in a specific brightness range are set to "1" and other pixels are set to "0", with respect to the partial optical image information. Also, in the position detection apparatus, the predetermined image processing in the detection object detection part can comprise executing the binarization processing after executing an opening processing that the partial optical image information is contracted and then expanded, by the same number of times. Further, in the position detection apparatus, the predetermined image processing in the detection object detection part can comprise calculating a morphological gradient of the partial optical image information; extracting the contour of the detection object; and executing the binarization processing after painting the contour of the detection object in black.

In the present disclosure, as a position detection system according to a mode 2, the position detection system can comprise: an imaging apparatus that images a space including a floor surface on which at least one detection object may be disposed; and the position detection apparatus according to the mode 1. The imaging apparatus can be communicatably connected to the position detection apparatus.

As a modification mode of the position detection system according to the mode 2, the position detection system can further comprise a distance sensor that measures a distance from the distance sensor itself to an entity (subject)-to-be-imaged including the detection object, wherein the distance sensor is communicatably connected to the position detection apparatus. Also, in the position detection system, the imaging apparatus can be a stereo camera.

In the present disclosure, as a remote control apparatus according to a mode 3, the remote control apparatus can comprise: the position detection apparatus according to the mode 1; a communication part that enables communication with a mobile body and an imaging apparatus; and a control part that controls an operation of the mobile body via the communication part, based on information relating to a position of the mobile body as the detection object detected by the position detection apparatus.

In the present disclosure, as a remote control system according to a mode 4, the remote control system can comprise: at least one of mobile body as a detection object; an imaging apparatus that images a space including at least a part of a range in which the mobile body moves; the remote control apparatus according to the mode 3; and a network that communicatably connects the imaging apparatus, the remote control apparatus and the mobile body.

In the present disclosure, as a position detection method according to a mode 5, the position detection method can comprise: creating map information representing a position in a space including a floor surface on which at least one detection object may be disposed, the position corresponding to each of pixels configuring optical image information representing an imaged image of at least the space, the optical image information being generated by an imaging apparatus imaging the space; creating mask information, using map information, by extracting, from the map information, a region of a predetermined height range within a height range from the floor surface when the detection object is disposed in the space; specifying partial optical image information, using the optical image information and the mask information, by removing a region corresponding to the mask information from the optical image information; and specifying a positional relationship between the map information and the partial optical image information at a pixel level, using the map information and the partial optical image information, and detecting a position of the detection object in the map information based on the specified positional relationship.

As a modification mode of the position detection method according to the mode 5, the position detection method can further comprise: executing a predetermined image processing to the partial optical image information, using the partial optical image information and detecting a contour of the detection object from the partial optical image information that has been subjected to the predetermined image processing; and detecting a position of the contour of the detection object in the map information, using the map information and information related to the contour of the detection object.

In the present disclosure, as a program according to a mode 6, the program can cause hardware resources to execute processings comprising: creating map information representing a position in a space including a floor surface on which at least one detection object may be disposed, the position corresponding to each of pixels configuring optical image information representing an imaged image of at least the space, the optical image information being generated by an imaging apparatus imaging the space; creating mask information, using map information, by extracting, from the map information, a region of a predetermined height range within a height range from the floor surface when the detection object is disposed in the space; specifying partial optical image information, using the optical image information and the mask information, by removing a region corresponding to the mask information from the optical image information; and specifying a positional relationship between the map information and the partial optical image information at a pixel level, using the map information and the partial optical image information, and detecting a position of the detection object in the map information based on the specified positional relationship.

As a modification mode of the program according to the mode 6, the program can cause hardware resources to execute processings further comprising: executing a predetermined image processing to the partial optical image information, using the partial optical image information and detecting a contour of the detection object from the partial optical image information that has been subjected to the predetermined image processing; and detecting a position of the contour of the detection object in the map information, using the map information and information related to the contour of the detection object.

Hereinafter, exemplary embodiments will be described with reference to drawings. When drawing-reference signs are attached in this application, they are solely for the purpose of assisting understanding, and are not intended to be limited to the illustrated modes. Also, the following exemplary embodiments are merely examples, and do not limit the present invention. Further, connecting lines between blocks such as drawings referred to in the following description includes both bidirectional and unidirectional. A one-way arrow schematically shows a flow of a main signal (data), and does not exclude bidirectionality. Furthermore, in circuit diagrams, block diagrams, internal configuration diagrams, connection diagrams, etc. shown in the disclosure of the present application, although explicit disclosure is omitted, an input port and an output port exist at the input end and the output end of each connection line, respectively. The same applies to the input/output interface. A program is executed via a computer apparatus, which comprises, for example, a processor, a storage device, an input device, a communication interface, and a display device as required, and the computer apparatus is configured to be able to communicate with inside device(s) or external apparatus(es)

(including computer(s)) via a communication interface regardless of whether it is wired or wireless.

First Exemplary Embodiment

Figure 2:
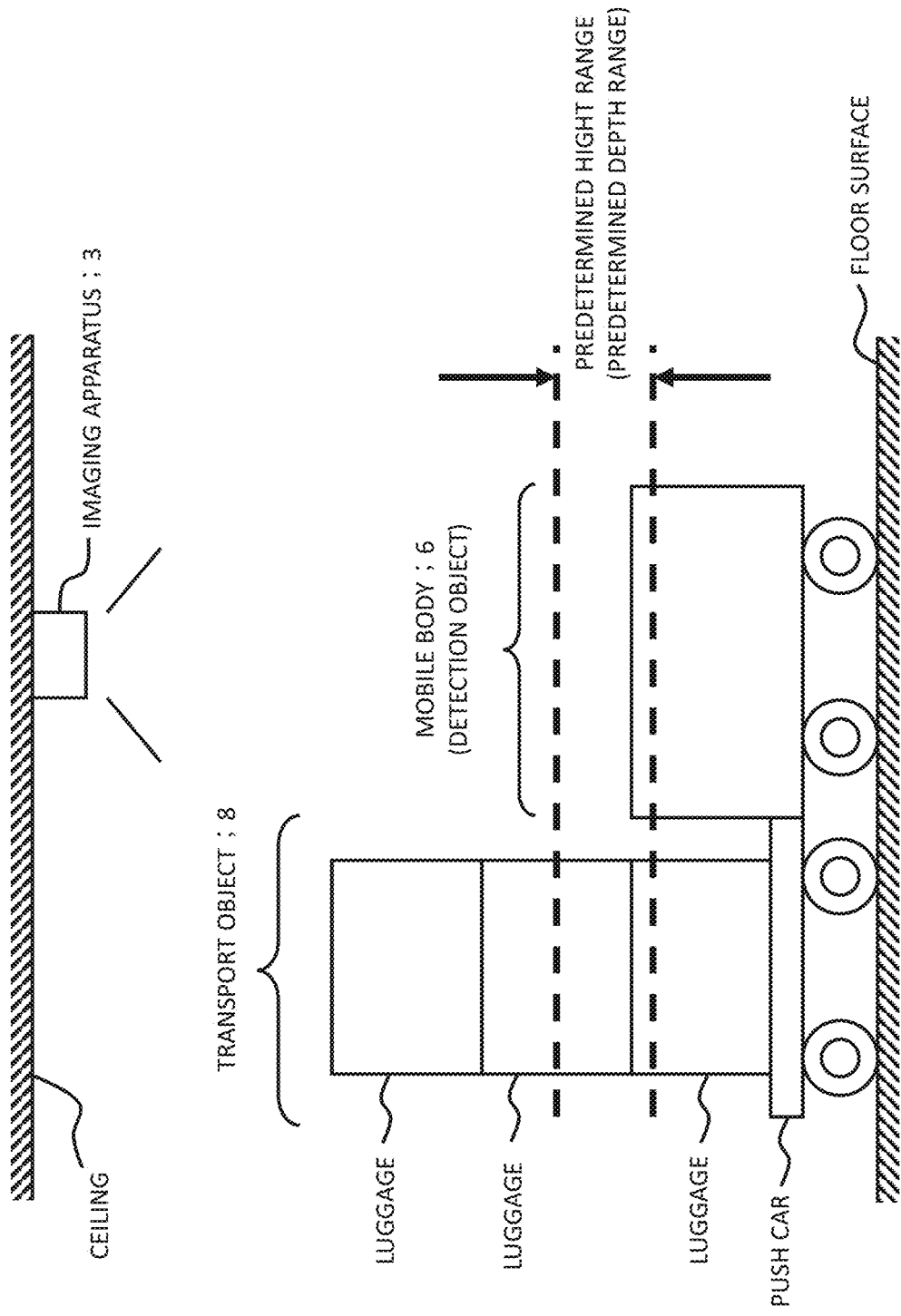
FIG. 2 is an image diagram schematically showing an example of a positional relationship between a detection object and an imaging apparatus in the position detection system according to the first exemplary embodiment.
Figure 3:
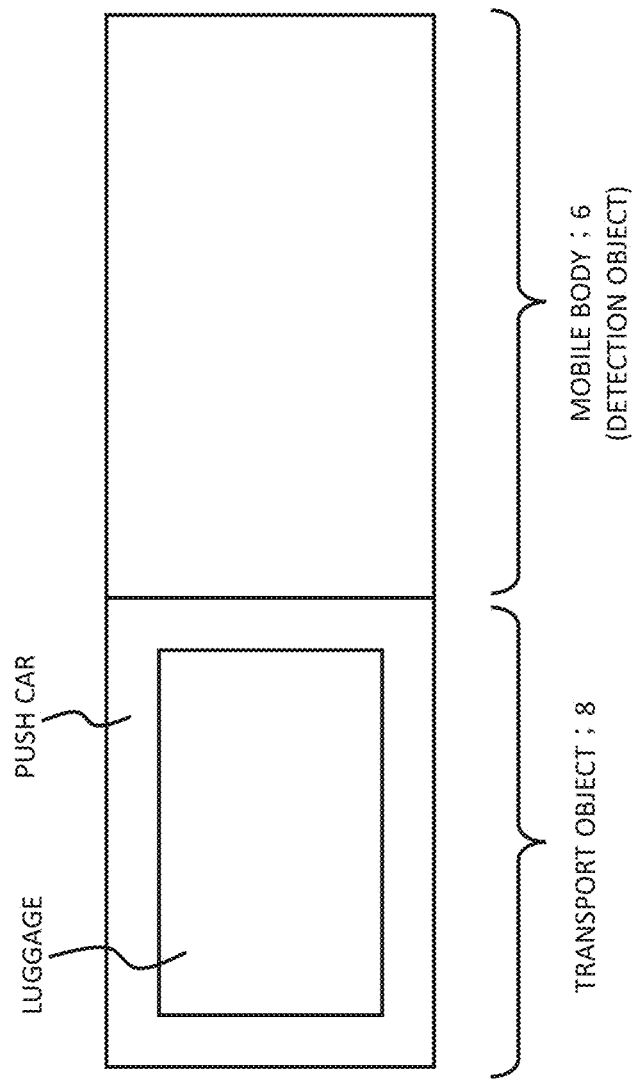
FIG. 3 is an image diagram schematically showing an example of optical image information imaged by the imaging apparatus in the position detection system according to the first exemplary embodiment.
Figure 4:
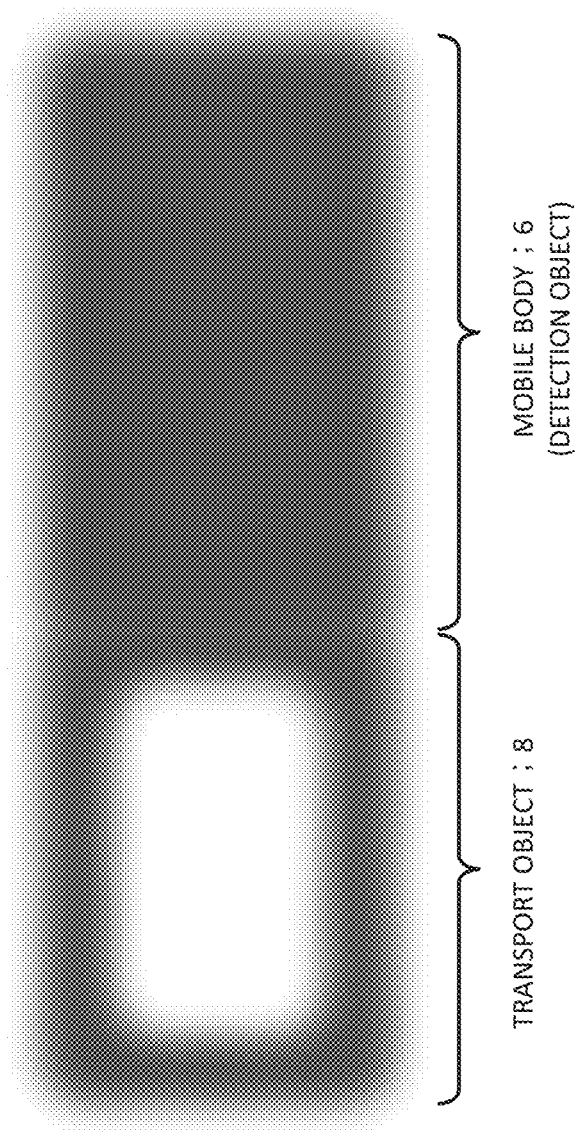
FIG. 4 is an image diagram schematically showing an example of map information created by a map information creation part of the position detection apparatus in the position detection system according to the first exemplary embodiment.
Figure 5:
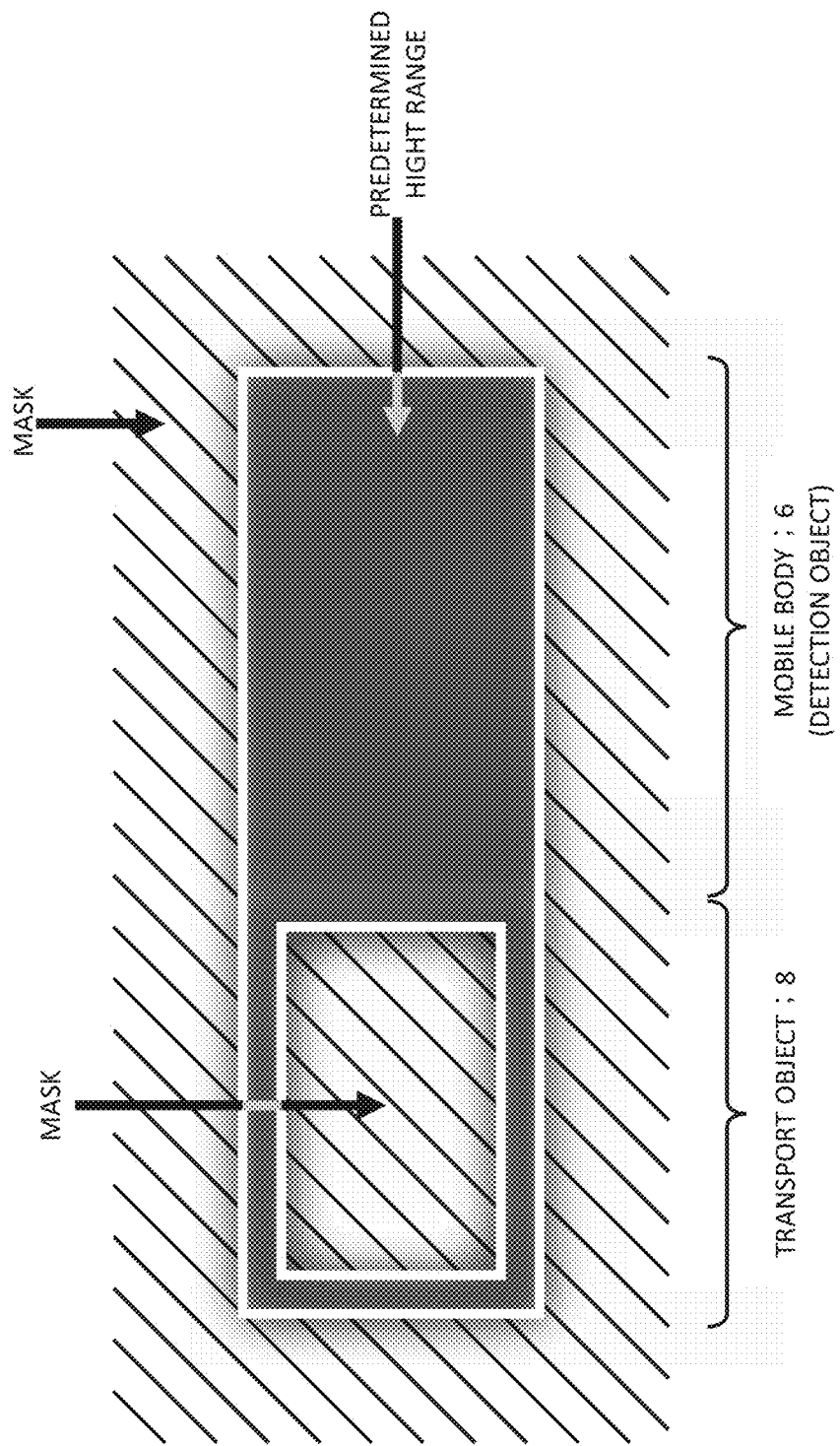
FIG. 5 is an image diagram schematically showing an example of mask information created by a mask information creation part of the position detection apparatus in the position detection system according to the first exemplary embodiment.
Figure 6:
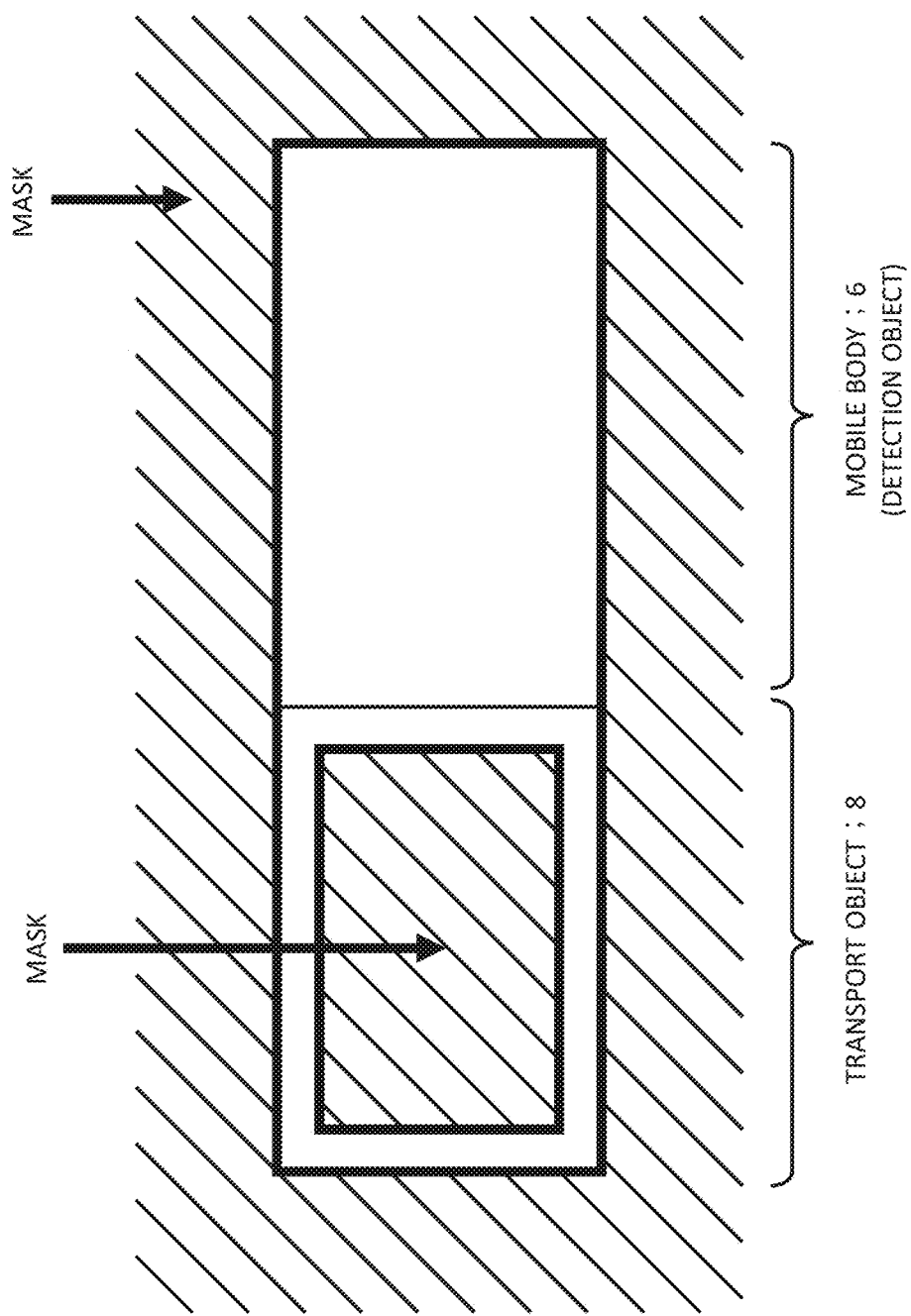
FIG. 6 is an image diagram schematically showing an example of specifying processing executed in the specifying part of the position detection apparatus in the position detection system according to the first exemplary embodiment.

A position detection system according to a first exemplary embodiment will be described with reference to the drawings. FIG. 1 is a block diagram schematically showing a configuration of the position detection system according to the first exemplary embodiment. FIG. 2 is an image diagram schematically showing an example of a positional relationship between a detection object and an imaging apparatus in the position detection system according to the first exemplary embodiment. FIG. 3 is an image diagram schematically showing an example of optical image information imaged by the imaging apparatus in the position detection system according to the first exemplary embodiment. FIG. 4 is an image diagram schematically showing an example of map information created by the map information creation part of the position detection apparatus in the position detection system according to the first exemplary embodiment. FIG. 5 is an image diagram schematically showing an example of mask information created by a mask information creation part of the position detection apparatus in the position detection system according to the first exemplary embodiment. FIG. 6 is an image diagram schematically showing an example of a specifying processing executed in a specifying part of the position detection apparatus in the position detection system according to the first exemplary embodiment.

The position detection system 1 is a system that detects a position of a detection object (mobile body 6 in FIG. 1). The position detection system 1 comprises: a position detection apparatus 2; and an imaging apparatus 3. Although the mobile body 6 is a detection object in FIG. 1, the present invention is not limited to this, and a transport object 8 may be a detection object. In the first exemplary embodiment, the mobile body 6 will be described as a detection object.

The position detection apparatus 2 is an apparatus that detects a position of the mobile body 6 (detection object), using the imaging apparatus 3. The position detection apparatus 2 exists outside the mobile body 6 (detection object). The position detection apparatus 2 is communicatably connected to the imaging apparatus 3. The position detection apparatus 2 comprises: a map information creation part 10; a mask information creation part 11; a specifying part 12; a detection object detection part 13; and a position detection part 14. In the position detection apparatus 2, for example, a hardware resource (for example, an information processing apparatus) including a processor, a memory, a network interface, and the like can be used. In this case, the hardware resource may be configured to comprise: a map information creation part 10; a mask information creation part 11; a specifying part 12; a detection object detection part 13; and a position detection part 14 virtually by executing a program in the processor while using the memory storing the program.

Here, the imaging apparatus 3 is an apparatus that images (shoots) an image having an angle of view in a space including at least a part (or all) of a range in which the mobile body 6 (detection object) moves. The imaging apparatus 3 is communicatably connected to the position detection apparatus 2, using at least one of wired and wireless communication technologies. The imaging apparatus 3 can be fixedly disposed (including mounted, etc.) at a position (ceiling in FIG. 2) overlooking the space, and can be placed so that an angle(s) of view by the imaging apparatus 3 becomes a predetermined direction (vertically downward in FIG. 2).

In FIG. 2, it is assumed that the mobile body 6 (detection object) moves two-dimensionally on a floor surface; it is assumed that the transport object 8 is a plurality of box-shaped luggage (three in FIG. 2) mounted on a push car; and it is assumed that the mobile body 6 transports the transport object 8 by pushing (or pulling) the transport object 8.

Also, the imaging apparatus 3 generates optical image information (for example, see FIG. 3; time point information may be included) related to the imaged space, and transmits the generated optical image information toward the position detection apparatus 2. As the imaging apparatus 3, for example, a camera can be used, wherein the camera focuses light from an entity-to-be-imaged by a lens; converts the focused light into an electric signal for each of pixels by an image sensor; generates optical image information in an image generation circuit, using the converted electric signal for each of pixels. Also, as the imaging apparatus 3, for example, a stereo camera comprising two cameras disposed at positions separated so as to have parallax can be used. In this case, by comparing the two pieces of optical image information obtained from the two cameras, a direction and a distance to an entity-to-be-imaged can be measured (presumed and estimated) like the human eye. In the case of such measurement, if an appearance of an entity-to-be-imaged is homogeneous, it is difficult to find a corresponding point in left and right optical image information, and accuracy may decrease. Therefore, a mechanism for projecting infrared pattern light as an auxiliary and making the appearance of an entity-to-be-imaged non-homogeneous may be used together.

For example, in the case of a monochrome image (gray-scale image), the optical image information can be digital information in which a brightness value (brightness information) is associated with each of pixels of a predetermined matrix size configuring an image.

The map information creation part 10 is a functional part (processing part) that creates map information (see, for example, FIG. 4) representing a position in a space (for example, three-dimensional space) including a floor surface on which at least one detection object may be disposed, using optical image information from the imaging apparatus 3 (see, for example, FIG. 3), wherein the position corresponds to each of pixels configuring the optical image information representing an imaged image of at least the space; the imaged image is generated by the imaging apparatus imaging the space. The map information creation part 10 outputs the created map information to the mask information creation part 11 and the position detection part 14. Also, the map information creation part 10 outputs the optical image information corresponding to the created map information to the specifying part 12 in order to secure a correspondence relationship between the map information and the optical image information.

Here, the map information can be information (map information) associated with which coordinate the mobile body 6 (detection object) and the transport object 8 that can be an entity-to-be-imaged of the imaging apparatus 3 are located in a three-dimensional space relative to each of pixels in the optical image information representing an image (still image, moving image) imaged by the imaging apparatus 3. In this case, the three-dimensional coordinate system can be regarded as a three-dimensional coordinate system representing height (depth) and spread. Although, an origin of the three-dimensional coordinate system may be set arbitrary, for example, it may be configured in a right-handed system (positive system) that a focusing position (lens position) of the imaging apparatus 3 (camera) is set to the origin; a direction away from the imaging apparatus 3 in an optical axis direction of the imaging apparatus 3 is set to a positive direction of z-axis; a direction corresponding to a transverse direction of optical image information imaged by the imaging apparatus 3 is set to x-axis; and a direction corresponding to a longitudinal direction thereof is the y-axis.

The map information of FIG. 4 is set a height direction (depth direction; a direction perpendicular to the paper surface of FIG. 4) as z-axis; represents positions within a predetermined height range (predetermined depth range; corresponding to a height range of detection object (mobile body 6)) shown in FIG. 2 on the XY plane in dark color; and represents positions higher and lower than the predetermined height range in light color. A contour of the mobile body 6 (detection object) is blurred in the map information of FIG. 4, because a shape of the contour is changed from moment to moment like an amoeba due to a measurement error. Also, in the map information of FIG. 4, even though there is no upper surface within a predetermined height range above an upper surface of the transport object 8, a frame-shaped contour appears in a region of the transport object 8, because due to a measurement error, an inclined surface appears to exist in a step part between the upper surface of the uppermost luggage and the upper surface of the push car in FIG. 2, and a part within the predetermined height range appears to exist in the inclined surface. The predetermined height range shown in FIG. 2 is a height range when a detection object is the mobile body 6, and a predetermined height range is set according to a height range of the transport object 8 when a detection object is the transport object 8.

In the map information of FIG. 4, since a part corresponding to the mobile body 6 (detection object) and a part of periphery of the transport object 8 are integrated, there is a problem that it is difficult to accurately detect a position of the mobile body 6 (detection object) only from the map information. Also, in the map information of FIG. 4, as described above, since a shape of the contour changes from moment to moment due to the positioning error, there is a problem that a position detection by shape recognition from the map information is practically insufficient in accuracy. Therefore, in order to solve these problems, the position detection apparatus 2 according to the present exemplary embodiment creates a mask (mask information) for removing a region (transport object 8, including a region of a floor surface) that is not within a predetermined height range in the map information as follows in the mask information creation part 11.

The mask information creation part 11 is a functional part (processing part) that creates mask information (for example, see "mask" in FIG. 5) by extracting a region of a predetermined height range within a height range from a floor surface when the detection object (mobile body 6) is arranged in a space imaged by the imaging apparatus 3 from the map information, using the map information (see, for example, FIG. 4) from the map information creation part 10. Here, the predetermined height range corresponds to a height range (see "predetermined height range" in FIG. 5) from a floor surface of the detection object (mobile body 6). Also, a region other than the region having the predetermined height range is a region higher than the predetermined height range and a region lower than the predetermined height range (that is, region closer and farther than the predetermined height range based on the imaging apparatus 3: a region shown by diagonal (hatching) lines in FIG. 5). It can be said that a specifying process by the specifying part 12 is a process of removing regions other than the region having the predetermined height range from the optical image information by covering it with the mask information created by the mask information creation part 11. The mask information creation part 11 outputs the created mask information to the specifying part 12.

That is, in the example of creating mask information in FIG. 5, the "mask (mask information)" is created in a region (region shown by diagonal lines in FIG. 5) within the predetermined height range other than a region (corresponding to the "predetermined height range" shown in black in FIG. 5) consisting of regions corresponding to the mobile body 6 (detection object) and a periphery of the transport object 8 in the map information exemplarily shown in FIG. 4. Therefore, the "mask (mask information)" exemplarily shown in FIG. 5 includes an upper surface of the transport object 8 and a floor surface locating farther than the predetermined height range.

The specifying part 12 is a functional part (processing part) that specifies partial optical image information by removing (masking) a region corresponding to the mask information from the optical image information (see FIG. 6), using the optical image information (see, for example, FIG. 3) from the map information creation part 10 and the mask information (for example, see FIG. 5) created by the mask information creation part 11, wherein the mask information corresponds to the optical image information. It can be said that a specifying process (masking process) by the specifying part 12 is a processing that limits a target that should be processed in the detection object detection part 13 described later by covering the optical image information with the map information and leaving the optical image information representing a region covered by the map information. Concretely, for example, when the number of pixels of the optical image information is "n", the mask information is held as a vector in which the number of elements is "n" and each element consists of "0" or "1", and the specifying part 12 calculates a product of a brightness information of j-th pixel and the j-th element of the mask information onto each of pixels of the optical image information, whereby the masking processing may be executed. The specifying part 12 outputs the specified partial optical image information toward the detection object detection part 13. Here, the partial optical image information is assumed to represent optical image information corresponding to at least a part of the image region of the certain whole image within the optical image information corresponding to a certain whole image (for example, an image of one frame).

The detection object detection part 13 is a functional part (processing part) executing a predetermined image processing (for example, binarization processing) onto the partial optical image information, using the partial optical image information from the specifying part 12, and detecting a contour (for example, shape) of the detection object (mobile body 6) from the partial optical image information which has been subjected to the predetermined image processing. The detection object detection part 13 outputs information (detection object information) related to the contour of the detected detection object (mobile body 6) toward the position detection part 14.

Here, the brightness information in the optical image information is different from the map information in the fact that there is very little temporal fluctuation. Therefore, in the partial optical image information obtained by masking the optical image information, the frame-shaped contour in the region of the transport object 8 as appearing in the map information of FIG. 4 does not appear, and only the contour of the detection object (mobile body 6) can be detected stably.

In the predetermined image processing, for example, a specific brightness range can be determined in advance, and it is possible to execute a binarization processing in which only the pixels in the particular brightness range are set to "1" and the other pixels are set to "0". Alternatively, for example, a known method may be used to automatically determine a threshold value and execute a binarization processing.

In the case of the example of FIG. 3, since the contour (shape) of the mobile body 6 (detection object) viewed from above looks like a rectangle, the detection object detection part 13 detects a rectangle from the partial optical image information obtained by executing a predetermined image processing. Although the contour of the detected detection object is a contour (planar shape) of the detection object viewed from above, the shape is not limited to the rectangle and may be any shape according to a contour of a detection object. When the detection object can be easily modified, the detection object detection part 13 may detect a figure designated in advance on the mobile body 6 by providing a difference in brightness.

The position detection part 14 is a functional part (processing part) that detects a position in a three-dimensional space of the contour of the detection object (mobile body 6) in the map information, using the map information from the map information creation part 10 and the detection object information from the detection object detection part 13. The position detection part 14 has a function of detecting a position of the detection object (mobile body 6) on the optical image information, using the detection object information. Also, the position detection part 14 has a function of detecting a position of the detection object (mobile body 6) in a space, using the map information and a position of the detection object (mobile body 6) on the optical image information. The position detection part 14 provides information (position information) related to the position of the detected detection object (mobile body 6) to a functional part (not shown) or outside as necessary.

Here, a position of the mobile body 6 (detection object) indicates a coordinate of a representative point, and can be, for example, a center of gravity of a rectangle. Also, unlike the map information, the optical image information does not include information representing a position on a space. Therefore, the position of the mobile body 6 (detection object) detected here is merely a position on the optical image information, and an unit thereof is a pixel. Further, in order to know a position in an actual space, the position detection part 14 detects a position of the mobile body 6 (detection object) in a space based on a position of the mobile body 6 (detection object) on the optical image information and the map information. As a result, a position of the mobile body 6 (detection object) in a space can be detected with high precision.

Figure 7:
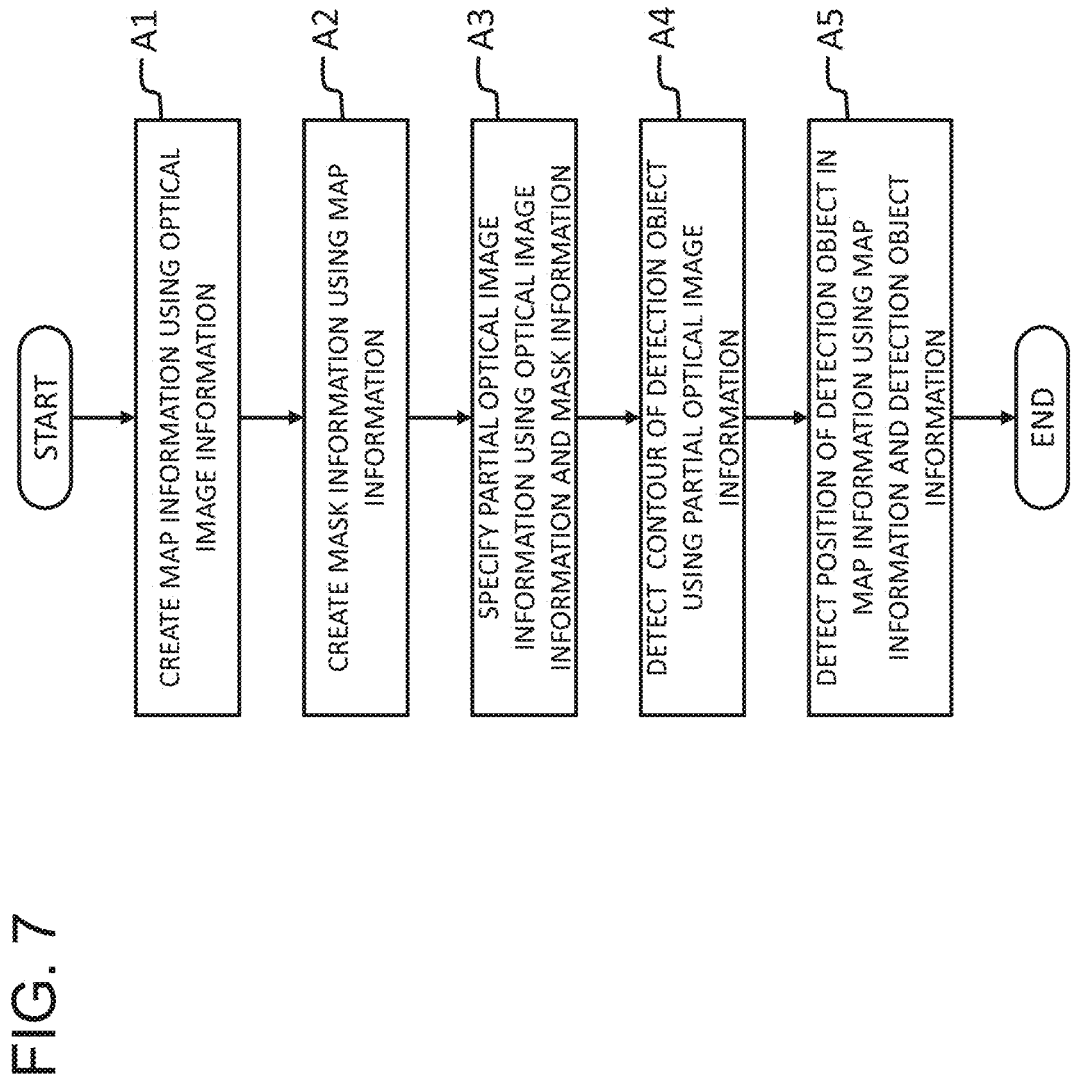
FIG. 7 is a flowchart schematically showing an operation of the position detection apparatus in the position detection system according to the first exemplary embodiment.

Next, an operation of the position detection apparatus in the position detection system according to the first exemplary embodiment will be described with reference to the drawings. FIG. 7 is a flowchart diagram schematically showing an operation of the position detection apparatus in the position detection system according to the first exemplary embodiment. Please refer to FIG. 1 about the configuration parts of the position detection system.

First, the map information creation part 10 of the position detection apparatus 2 creates map information (for example, see FIG. 4), using the optical image information (for example, see FIG. 3) from the imaging apparatus 3 (Step A1).

Next, the mask information creation part 11 of the position detection apparatus 2 creates mask information (for example, see "mask" in FIG. 5), using the map information (for example, see FIG. 4) from the map information creation part 10 (Step A2).

Next, the specifying part 12 of the position detection apparatus 2 specifies partial optical image information by removing (masking) a region corresponding to mask information, from the optical image information (see FIG. 6), using the optical image information from the map information creation part 10 (see, for example, FIG. 3) and the mask information (for example, see "mask" in FIG. 5) corresponding to the optical image information, from the mask information creation part 11 (Step A3).

Next, the detection object detection part 13 of the position detection apparatus 2 executes a predetermined image processing (for example, binarization processing) onto the partial optical image information, using the partial optical image information from the specifying part 12, and detects a contour (for example, shape) of the detection object (mobile body 6) from the partial optical image information which has been subjected to the predetermined image processing (Step A4).

Next, the position detection part 14 of the position detection apparatus 2 detects a position of the contour of the detection object (mobile body 6) in the map information, using the map information from the map information creation part 10 and information (detection object information) related to the contour of the detection object (mobile body 6) detected by the detection object detection part 13 (Step A5), and then the process returns to the start.

According to the first exemplary embodiment, by using the imaging apparatus 3 disposed at a position (for example, ceiling) where the detection object (mobile body 6) can be overlooked, it is possible to contribute to accurately (with high precision) detecting a position of a detection object (mobile body 6). The reason resides in that it is possible to detect only the contour of the detection object (mobile body 6) stably by masking the optical image information including brightness information having very little temporal fluctuation with the mask information created by using the map information, and a position of the detection object (mobile body 6) can be detected with a high precision.

Second Exemplary Embodiment

Figure 8:
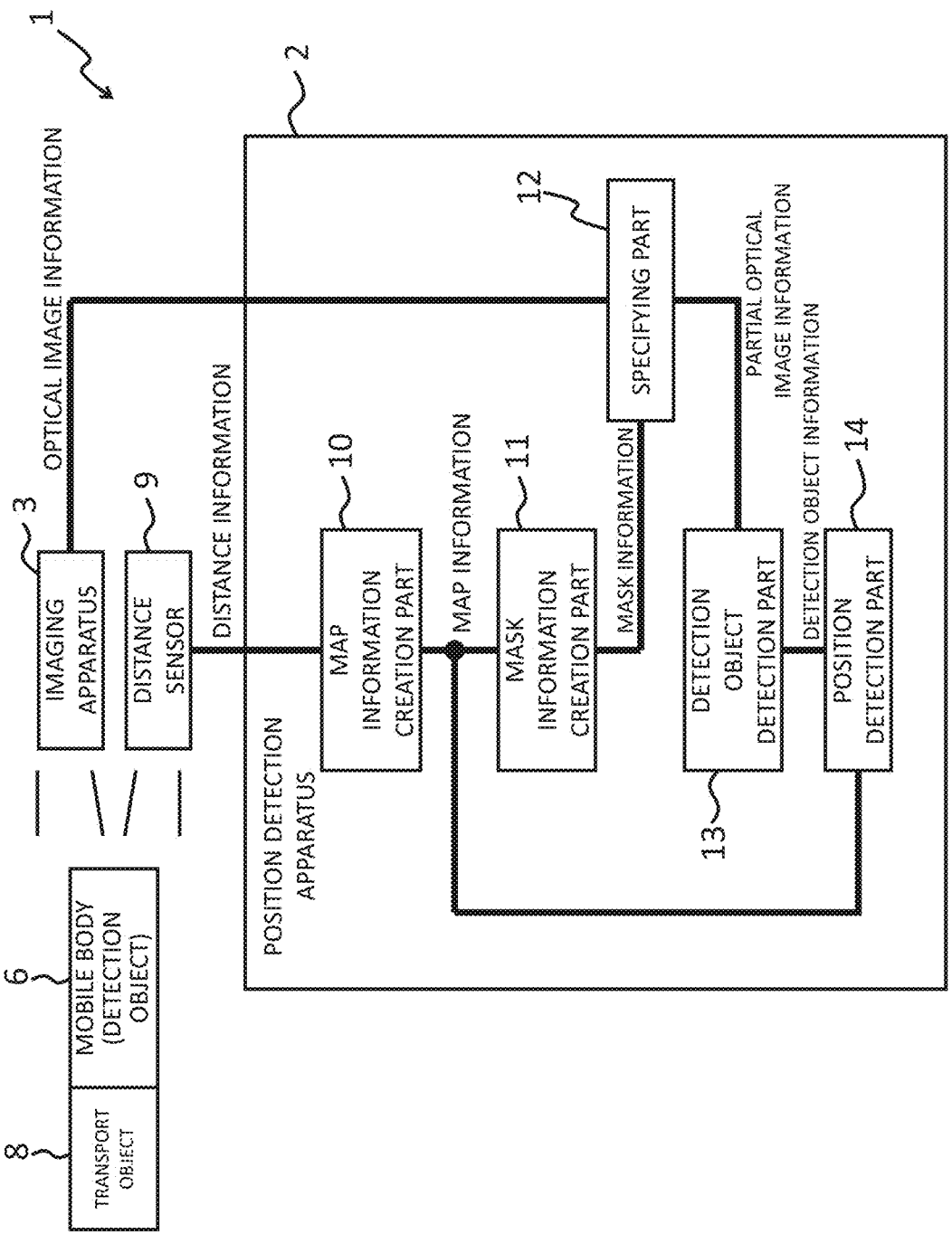
FIG. 8 is a block diagram schematically showing a configuration of a position detection system according to a second exemplary embodiment.

A position detection system according to a second exemplary embodiment will be described with reference to the drawings. FIG. 8 is a block diagram schematically showing a configuration of the position detection system according to the second exemplary embodiment.

The second exemplary embodiment is a modification of the first exemplary embodiment, in which distance information of a distance sensor 9 is used as information used in the map information creation part 10 instead of the optical image information of the imaging apparatus 3, and the optical image information of the imaging apparatus 3 is input to the specifying part 12 without going through the map information creation part 10.

The distance sensor 9 is a sensor that measures a distance from the distance sensor 9 itself to an entity (subject)-to-be-imaged including the detection object (mobile body 6).

For example, the distance sensor 9 can be fixedly disposed at a position (for example, ceiling) from which it can overlook a space including at least a part (or all) of the movable range of a mobile body 6 (detection object), and can be arranged so that a sensing direction is a predetermined direction (vertically downward in FIG. 2). For example, as the distance sensor 9, a distance sensor of time-of-flight type can be used, wherein the distance sensor of time-of-flight type measures a distance from the distance sensor 9 itself to the mobile body 6 (detection object) by projecting the modulated light onto the mobile body 6 (detection object), and measuring a time (i.e., round return time) until the modulated light is reflected by the mobile body 6 (detection object) and returns. The distance sensor 9 outputs information (distance information) related to the measured distance to the map information creation part 10.

The map information creation part 10 creates map information, using the distance information from the distance sensor 9, wherein the map information represents a position in a space including a floor surface on which at least one detection object may be disposed; the position corresponds to each of pixels configuring the optical image information; the optical image information represents at least the imaged image in the space; and the imaged image is generated by the imaging apparatus imaging the space.

The specifying part 12 specifies partial optical image information by removing (masking) the region corresponding to the mask information, from the optical image information, using the optical image information from the imaging apparatus 3 and the mask information corresponding to the optical image information, from the mask information creation part 11.

Other configurations and operations are similar to those of the first exemplary embodiment.

According to the second exemplary embodiment, by using the imaging apparatus 3 and the distance sensor 9 disposed at a position (for example, ceiling) from which the detection object (mobile body 6) can be overlooked, it is possible to contribute to accurately (with high precision) detecting a position of a detection object (mobile body 6). The reason resides in that by masking the optical image information including brightness information having very little temporal fluctuation with the mask information created by using the map information based on the distance information from the distance sensor 9, only the contour of the detection object (mobile body 6) can be stably detected, and a position of the detection object (mobile body 6) can be detected with a high precision.

Third Exemplary Embodiment

Figure 9:
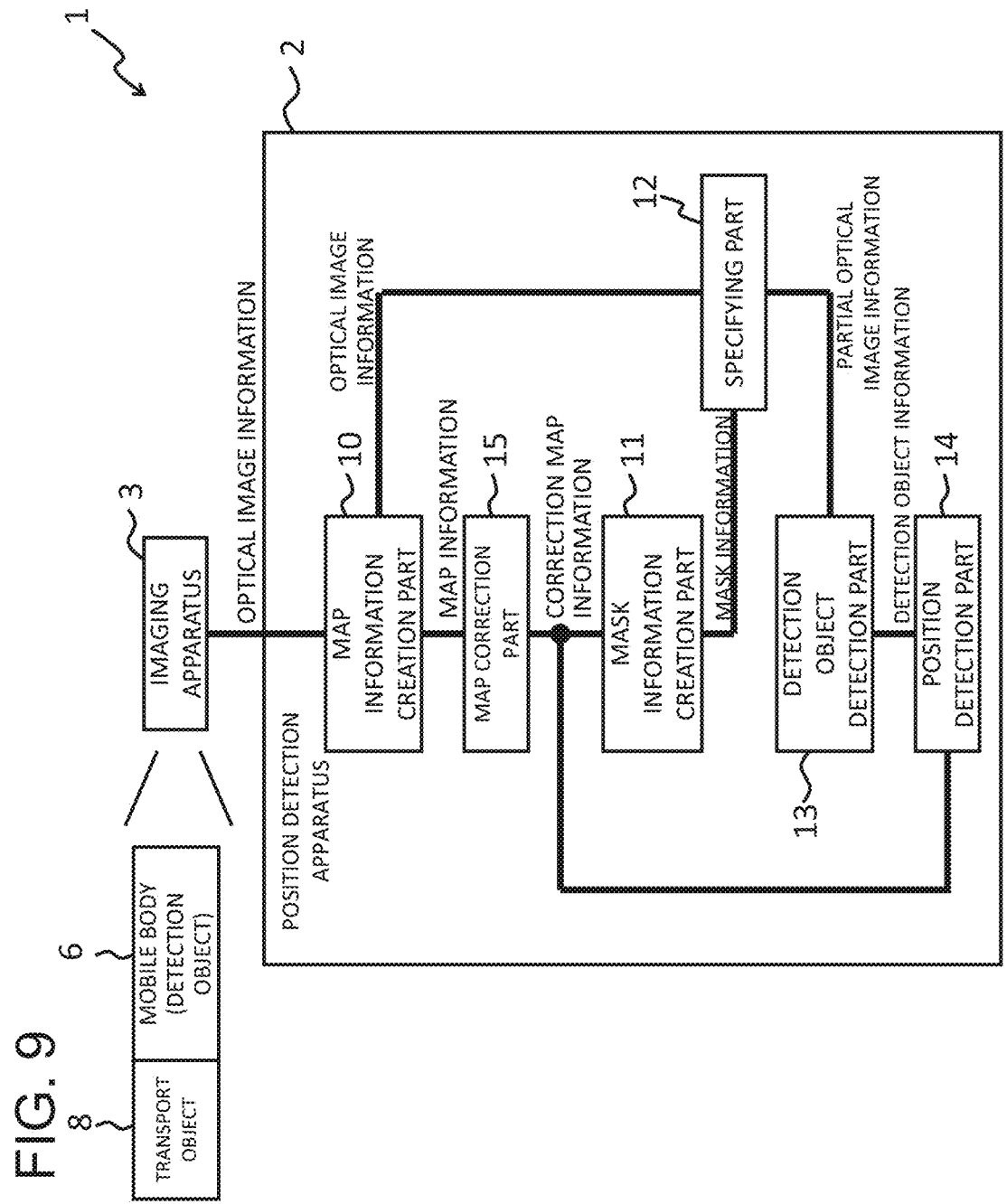
FIG. 9 is a block diagram schematically showing a configuration of a position detection system according to a third exemplary embodiment.

A position detection system according to a third exemplary embodiment will be described with reference to the drawings. FIG. 9 is a block diagram schematically showing a configuration of the position detection system according to the third exemplary embodiment.

A third exemplary embodiment is a modification of a first exemplary embodiment. The position detection system 1 according to the third exemplary embodiment further comprises a map correction part 15, wherein the map correction part 15 corrects the map information so that an imaging angle (i.e., angle of view) by the imaging apparatus 3 is vertically downward with respect to the map information created by the map information creation part 10.

Although in the first exemplary embodiment, as shown in FIG. 2, it is preferable that the imaging apparatus 3 is disposed on (or at) a ceiling and the angle of view of the imaging apparatus 3 is arranged so as to be vertically downward, even if the angle of view of the imaging apparatus 3 is disposed vertically downward as much as possible, the disposition accuracy is not sufficient and there is a possibility that it will be disposed with a slight inclination. In this case, a z-coordinate (corresponding to height and depth) of a floor surface is not uniform, and even if a certain z-coordinate range is designated to limit a height range of the detection object, when there are detection objects at each of the one end and the other end of the optical image information, one or both detection objects may deviate from a detection range and position detection may not be possible. Even in such a case, as shown in FIG. 9, the map correction part 15 is provided and the map information is corrected so that an angle of view by the imaging apparatus 3 is vertically downward with respect to the map information created by the map information creation part 10, thereby enabling position detection.

The map information (correction map information) corrected by the map correction part 15 is provided to each of the mask information creation part 11 and the position detection part 14, and a mask information creation process and a position detection processing are executed, using the correction map information.

Here, the map information can be corrected as follows, for example. At least three points on a floor surface are selected in advance from the map information, and a least squares plane of those points is obtained. Although by increasing the number of points, it is made less susceptible to height (depth) measurement errors, for example, when a stereo camera is used as the imaging apparatus 3, utilizing the fact that accuracy is increased as a distance from the stereo camera to an entity-to-be-imaged is closer, the least squares plane may be calculated by mainly selecting points from near of center as close to the stereo camera as possible. Now, it is assumed that the least squares plane is obtained by the following Formula 1.

$$z = ax + by + c \qquad \text{[Formula 1]}$$

Here, a unit of "z" corresponding to a height (depth) is a unit (for example, meter) representing a length in a three-dimensional space. On the other hand, it should be noted that units of "x" and "y" corresponding to longitudinal and transverse directions are pixels representing positions in optical image information. Also, "a", "b", and "c" are constants obtained by a method of least squares. It is assumed that a center coordinate of an image region represented by optical image information is (x, y)=(0,0) and a position of a floor surface corresponding to a center of the image region represented by the optical image information is used as a reference. In this case, in order to correct the height (depth) at points other than the center coordinate (reference), for example, (x, y)=(X, Y), assuming that the height (depth) in (X, Y) obtained from the map information originally was "Z", Formula 1 in which "Z" is replaced with the following Formula 2 may be used as a new height (correction height).

$$Z - aX - bY \qquad \text{[Formula 2]}$$

Other configurations and operations are similar to those of the first exemplary embodiment.

As another correction method of map information, height data may be exponentially smoothed for each of pixels in order to absorb a temporal fluctuation (i.e., fluctuation along time).

According to the third exemplary embodiment, similarly to the first exemplary embodiment, by using the imaging apparatus 3 disposed at a position (for example, ceiling) from which the detection object (mobile body 6) can be overlooked, it is possible to contribute to accurately (with a high precision) detecting a position of a detection object (mobile body 6), and by executing the above correction processing for all of pixels of the map information, it is possible to correct errors to some extent due to the imaging apparatus 3 being disposed in a titled fashion at an angle, as a result, it is possible to improve accuracy of creating mask information, using the map information by the mask information creation part 11.

Fourth Exemplary Embodiment

Figure 10:
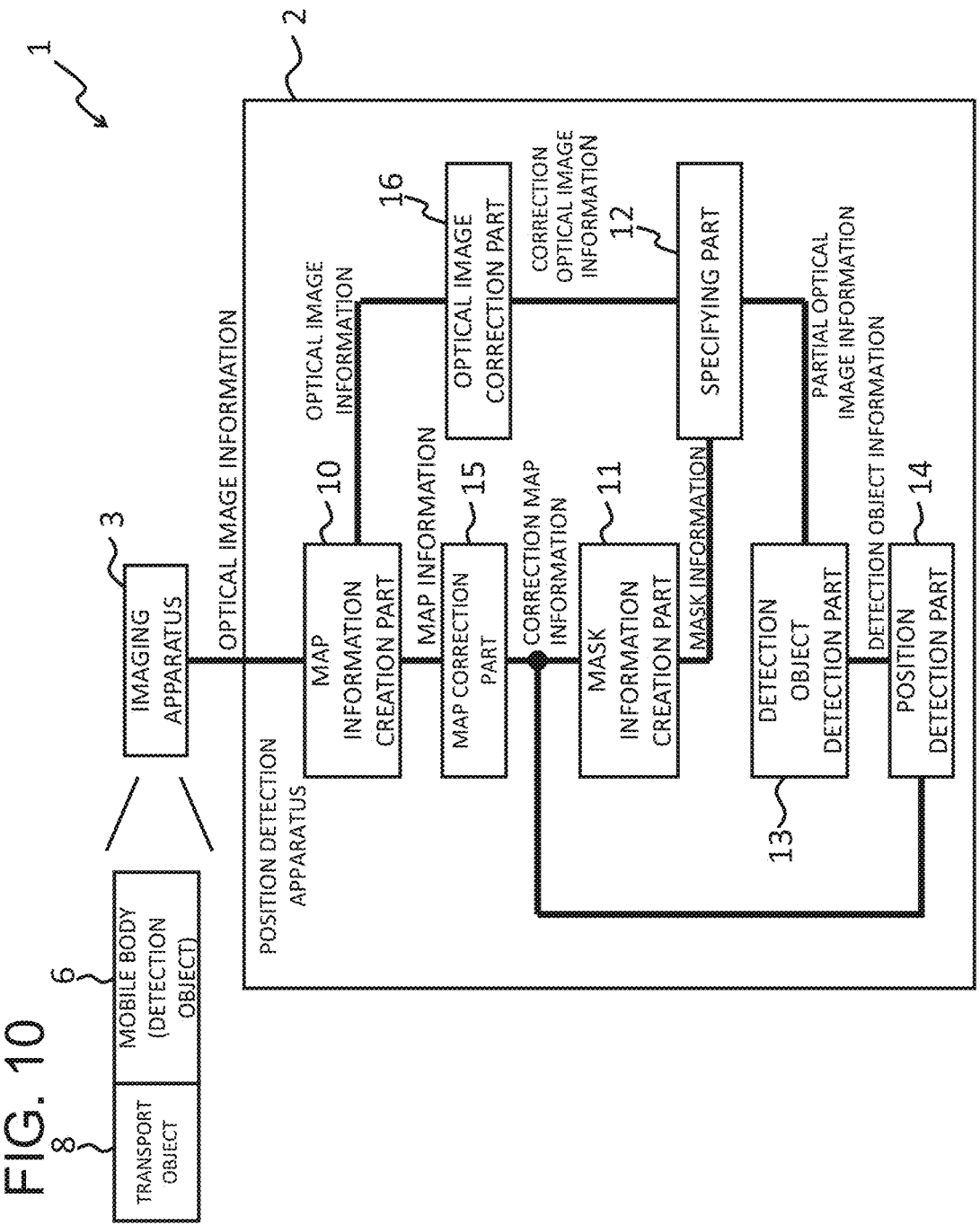
FIG. 10 is a block diagram schematically showing a configuration of a position detection system according to a fourth exemplary embodiment.

A position detection system according to a fourth exemplary embodiment will be described with reference to the drawings. FIG. 10 is a block diagram schematically showing a configuration of the position detection system according to the fourth exemplary embodiment.

The fourth exemplary embodiment is a modification of the third exemplary embodiment. The position detection system 1 according to the fourth exemplary embodiment further comprises an optical image correction part 16 that corrects the optical image information from the map information creation part 10.

The optical image imaged by the imaging apparatus 3 may appear dark in a peripheral portion of the optical image (peripheral darkening, fall down of peripheral light intensity), even if an entity-to-be-imaged has a uniform brightness, depending on a design of an optical system of the imaging apparatus 3. Therefore, for example, even if it is attempted to detect a "rectangle having a brightness equal to or higher than a certain value" in the specifying part 12, the reference brightness may differ between a central portion and a peripheral portion of an image. Therefore, as shown in FIG. 10, it is desirable to provide the optical image correction part 16 that corrects brightness or hue accompanying peripheral darkening in the optical image information. At this time, the map correction part 15 shown in the third exemplary embodiment may be used in combination.

The optical image information (corrected optical image information) corrected by the optical image correction part 16 is supplied to the specifying part 12, and extraction processing is executed, using the corrected optical image information.

An operation (optical image correction method, brightness correction method) of the optical image correction part 16 in a case where the optical image information is a monochrome image having only brightness information is as follows. When a coordinate of a center (center point) of an image region represented by the optical image information is set to "(x, y)=(0,0)", in order to correct the brightness in points (for example, (x, y)=(X, Y)) other than the center point, assuming that brightness in (X, Y) originally obtained from the optical image information was "B", Formula 1 in which "B" is replaced with the following Formula 3 may be used as a new brightness (corrected brightness; corrected optical image information).

$$B+A(X^2+Y^2)$$ [Formula 3]

Here, "A" is a parameter. "A" can be obtained, for example, by shooting an entity-to-be-imaged of uniform color and adjusting brightness of each of pixels of the optical image information so as to become appropriate.

Other configurations and operations are similar to those of the third exemplary embodiment. Also, the optical image correction part 16 may be applied to the first and second exemplary embodiments.

According to the fourth exemplary embodiment, similarly to the third exemplary embodiment, by using the imaging apparatus 3 disposed at a position (for example, ceiling) from which the detection object (mobile body 6) can be overlooked, it is possible to contribute to accurately (with high precision) detecting a position of a detection object (mobile body 6), and it is possible to appropriately process optical image information in which a peripheral portion appears dark due to a design of an optical system.

Fifth Exemplary Embodiment

A position detection system according to a fifth exemplary embodiment will be described.

The fifth exemplary embodiment is a modification of the first exemplary embodiment, and is a modification of the image processing (binarization processing) and the detection processing in the detection object detection part 13.

The detection object detection part 13 of FIG. 1 detects a contour of the detection object (mobile body 6) in a clarified state of a contour (for example, shape) of the detection object (mobile body 6) by determining a specific brightness range with respect to the partial optical image information to execute a binarization processing. In this case, when executing the binarization processing, a contour of the detection object (mobile body 6) cannot be clearly separated due to an influence of a light source, reflected light, etc., and there may be an occasion where binary image may be obtained only in a form in which the contour of the detection object (mobile body 6) and adjacent figures are connected.

Therefore, in such a case, in the fifth exemplary embodiment, when executing the binarization processing, the detection object detection part 13 executes the binarization processing after executing an opening processing that the partial optical image information is contracted and then expanded, by the same number of times.

Also, in the fifth exemplary embodiment, when executing the binarization processing, the detection object detection part 13 may execute processings comprising: calculating a morphology gradient of the partial optical image information (executes processing of taking differences between an expanded image and a contracted image onto the partial optical image information); extracting a contour of the detection object (mobile body 6); painting a contour portion of the detection object (mobile body 6) black; and then executing the binarization processing.

According to these processings, noise can be removed, and a figure adjacent to the detection object (mobile body 6) can be separated. However, even if the figure adjacent to the detection object (mobile body 6) is clearly separated, it is not always assumed that only the target detection object (mobile body 6) is detected by brightness threshold processing.

Therefore, in the fifth exemplary embodiment, the detection object detection part 13 extracts, for example, only a figure within a certain range of area or a figure within a certain range of circumference length, onto the detected figure in order to be able to detect by limiting the detection object.

Other configurations and operations are similar to those of the first exemplary embodiment. Also, the fifth exemplary embodiment may be applied to the second to fourth exemplary embodiments.

According to the fifth exemplary embodiment, similarly to the first exemplary embodiment, by using the imaging apparatus 3 disposed at a position (for example, ceiling) from which the detection object (mobile body 6) can be overlooked, it is possible to contribute to accurately (with high precision) detecting a position of a detection object (mobile body 6), and it is possible to improve detection of only the target detection object (mobile body 6).

Sixth Exemplary Embodiment

Figure 11:
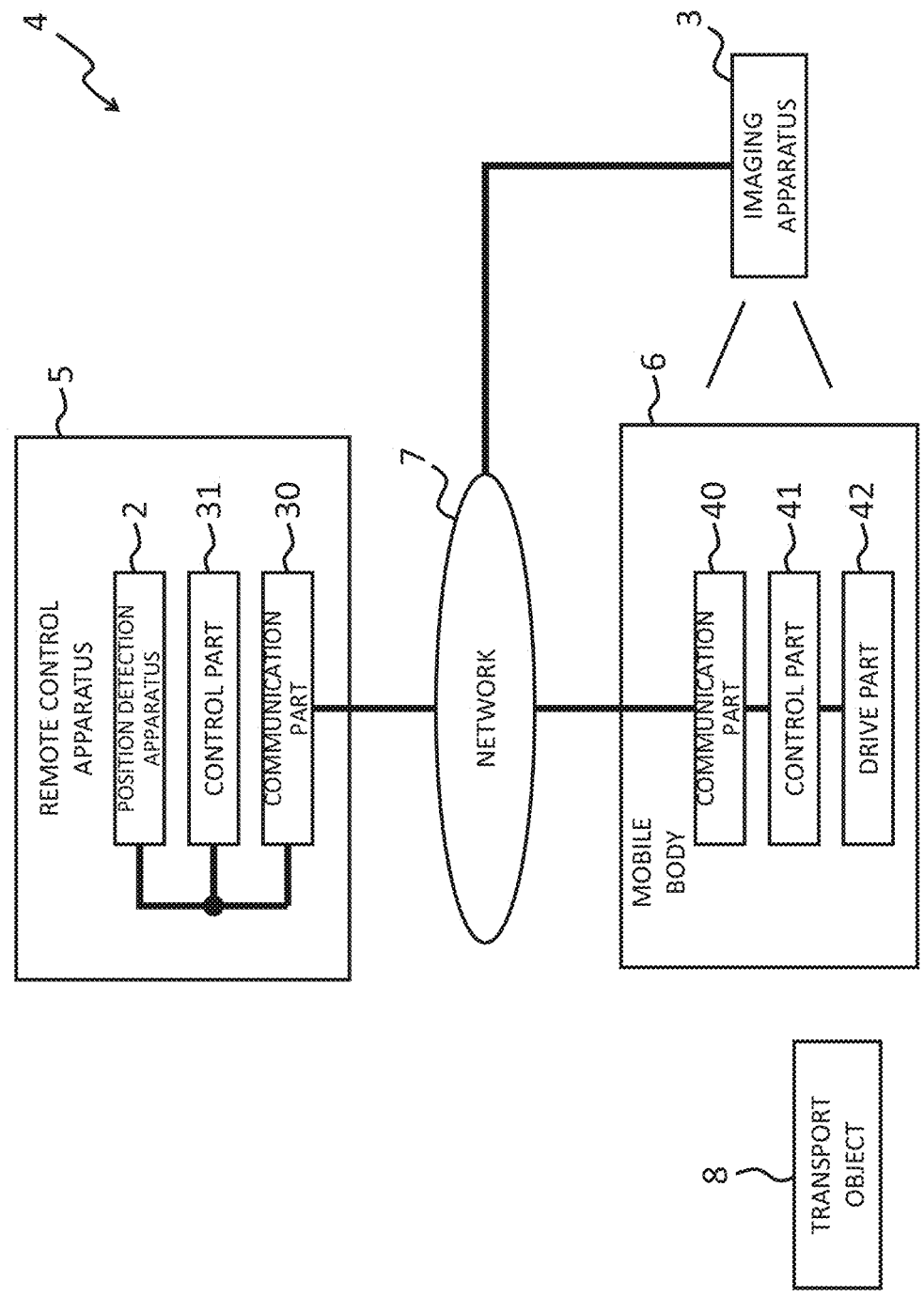
FIG. 11 is a block diagram schematically showing a configuration of a remote control system according to a sixth exemplary embodiment.

A remote control system according to a sixth exemplary embodiment will be described with reference to the drawings. FIG. 11 is a block diagram schematically showing a configuration of the remote control system according to the sixth exemplary embodiment.

The remote control system 4 is a system that remotely controls the mobile body 6, using the position detection systems (position detection apparatus, imaging apparatus) according to the first to fifth exemplary embodiments. The remote control system 4 comprises: an imaging apparatus 3; a remote control apparatus 5; a mobile body 6; and a network (communication network) 7.

The imaging apparatus 3 is an apparatus that images (shoots) a space including at least a part (or all) of a movable range of the mobile body 6 (detection object). The imaging apparatus 3 is fixedly disposed (including mounting) at a position (for example, ceiling) from which the space can be overlooked, and can be arranged so that an angle of view by the imaging apparatus 3 is set to a predetermined direction (for example, vertically downward). The imaging apparatus 3 is communicatably connected to the remote control apparatus 5 via the network 7. The imaging apparatus 3 generates optical image information related to an imaged space, and transmits the generated optical image information to the remote control apparatus 5. Other configurations and operations of the imaging apparatus 3 are similar to those of the imaging apparatus (3 in FIG. 1) of the first exemplary embodiment.

The remote control apparatus 5 is an apparatus that remotely controls the mobile body 6 (detection object). The remote control apparatus 5 is communicatably connected to the imaging apparatus 3 and the mobile body 6 via the network 7. A hardware resource (for example, an information processing apparatus) comprising: a processor; a memory; a network interface, and the like can be used as the remote control apparatus 5. In this case, the hardware resource may virtually configure: a position detection apparatus 2; a communication part 30; and a control part 31 by executing the program in the processor while using the memory storing the program.

The position detection apparatus 2 is an apparatus that detects a position of the mobile body 6 (detection object), using the imaging apparatus 3. The position detection apparatus 2 is communicatably connected to the imaging apparatus 3 via the network 7 and the communication part 30. The position detection apparatus 2 detects a position of the mobile body 6 (detection object) by the same operation as the position detection apparatus (2 in FIGS. 1, 8 to 10) according to the first to fifth exemplary embodiments, using the optical image information from the imaging apparatus 3. The position detection apparatus 2 outputs information (position information) related to the position of the detected mobile body 6 (detection object) to the control part 31. Other configurations and operations of the position detection apparatus 2 are similar to those of the position detection apparatus (2 in FIGS. 1, 8 to 10) according to the first to fifth exemplary embodiments.

The communication part 30 is a functional part that enables communication with the mobile body 6 and the imaging apparatus 3 via the network 7. The communication part 30 may be able to communicate with the mobile body 6 and the imaging apparatus 3, using, for example, infrared rays or Bluetooth (registered trademark) without going through the network 7. The communication part 30 may have a configuration capable of communicating with an external apparatus (not shown; for example, a tablet terminal, a mobile communication terminal, etc.). The communication part 30 is communicatably connected to the position detection apparatus 2 and the control part 31.

The control part 31 is a functional part that controls an operation of the mobile body 6 (detection object). The control part 31 is communicatably connected to the mobile body 6 (detection object) via the communication part 30 and the network 7. The control part 31 controls (adjusts) an operation (movement speed, movement direction, drive torque, etc.) of the mobile body 6 (detection object) so as to move (travel) to a preset target point, using the position information from the position detection apparatus 2.

The mobile body 6 is an object (apparatus, robot) that transports the transport object 8 by pushing (or pulling) the transport object 8. The mobile body 6 is communicatably connected to the remote control apparatus 5 via the network 7. The mobile body 6 comprises: a communication part 40; a control part 41; and a drive part 42.

The communication part 40 is a functional part that enables communication with the remote control apparatus 5 via the network 7. The communication part 40 may be able to communicate with the remote control apparatus 5, using, for example, infrared rays or Bluetooth (registered trademark) without going through the network 7. The communication part 40 is communicatably connected to the control part 41.

The control part 41 is a functional part that controls an operation of the drive part 42. The control part 41 is communicatably connected to the remote control apparatus 5 via the communication part 40 and the network 7. The control part 41 controls (adjusts) operation (wheel rotation speed, drive torque, etc.) of the drive part 42 based on information (control information) related to the control from the remote control apparatus 5.

The drive part 42 is a functional part that drives movement parts (wheels, tires, tracks, etc.; not shown). As the drive part 42, for example, a drive unit including a motor, a speed reducer, a driver, various sensors (current sensor, torque sensor, position sensor, etc.), a regulator, movement parts, and the like can be used. The drive part 42 is controlled by the control part 41.

The network 7 is an information communication network that communicatably connects between the imaging apparatus 3, the remote control apparatus 5, and the mobile body 6 (detection object). As the network 7, for example, a wireless LAN (Local Area Network) can be used.

According to the sixth exemplary embodiment, similarly to the first exemplary embodiment, by using the imaging apparatus 3 disposed at a position (for example, ceiling) from which the detection object (mobile body 6) can be overlooked, it is possible to contribute to accurately (with high precision) detecting a position of a detection object (mobile body 6), and it is possible to contribute to improving accuracy of a transport work performed by remotely controlling the mobile body 6 based on the detected position.

Seventh Exemplary Embodiment

Figure 12:
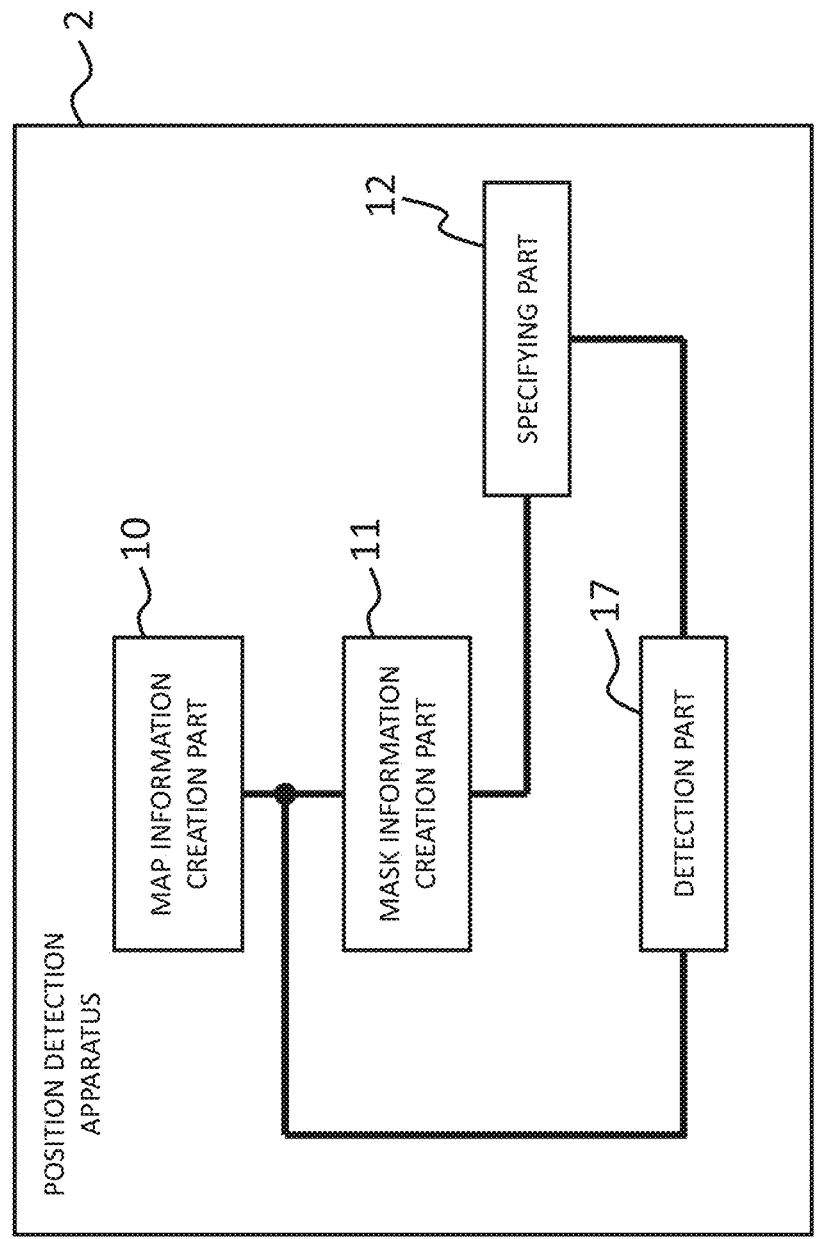
FIG. 12 is a block diagram schematically showing a configuration of a position detection apparatus according to a seventh exemplary embodiment.

A position detection apparatus according to a seventh exemplary embodiment will be described with reference to the drawings. FIG. 12 is a block diagram schematically showing a configuration of the position detection apparatus according to the seventh exemplary embodiment.

The position detection apparatus 2 is an apparatus that detects a position of a detection object (not shown). The position detection apparatus 2 comprises: a map information creation part 10; a mask information creation part 11; a specifying part 12; and a detection part 17.

The map information creation part 10 creates map information representing a position in a space including a floor surface on which at least one detection object (not shown) may be disposed, wherein the position corresponds to each of pixels configuring optical image information representing at least an imaged image in the space; and the optical image information is generated by an imaging apparatus (not shown) imaging the space.

The mask information creation part 11 creates mask information by extracting a region of a predetermined height range within a height range from a floor surface when a detection object (not shown) is disposed in a space imaged by the imaging apparatus (not shown) from the floor surface, using the map information.

The specifying part 12 specifies partial optical image information by removing (masking) a region corresponding to the mask information from the optical image information, using the optical image information and the mask information.

The detection part 17 specifies a positional relationship between the map information and the partial optical image information at a pixel level, using the map information and the partial optical image information, and detects a position of the detection object (not shown) in the map information, based on the specified positional relationship.

Figure 13:
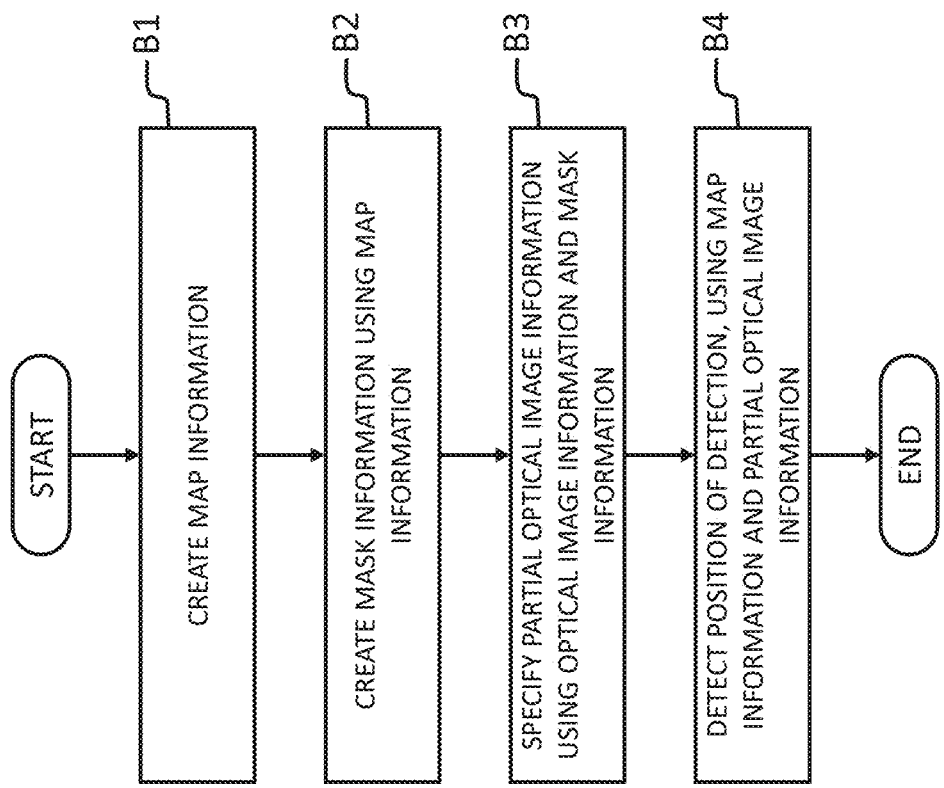
FIG. 13 is a flowchart schematically showing an operation of the position detection apparatus according to the seventh exemplary embodiment.

Next, an operation of the position detection apparatus according to the seventh exemplary embodiment will be described with reference to the drawings. FIG. 13 is a flowchart schematically showing the operation of the position detection apparatus according to the seventh exemplary embodiment. Please refer to FIG. 12 about the configuration parts of the position detection apparatus.

First, the map information creation part 10 of the position detection apparatus 2 creates map information representing a position in a space including a floor surface on which at least one detection object (not shown) may be disposed, wherein the position corresponds to each of pixels configuring optical image information representing an imaged image in at least the space; and the optical image information is generated by an imaging apparatus (not shown) imaging the space (Step B1).

Next, the mask information creation part 11 of the position detection apparatus 2 creates mask information by extracting a region of a predetermined height range within a height range from a floor surface when the detection object (not shown) is disposed in the space imaged by the imaging apparatus (not shown) from the map information, using the map information (Step B2).

Next, the specifying part 12 of the position detection apparatus 2 specifies partial optical image information by removing (masking) a region corresponding to the mask information from the optical image information, using the optical image information and the mask information (Step B3).

Next, the detection part 17 of the position detection apparatus 2 specifies a positional relationship between the map information and the partial optical image information at a pixel level, using the map information and the partial optical image information, and detects a position (corresponding to a position of the detection object in the space imaged by the imaging apparatus (not shown)) of the detection object (not shown) in the map information based on the specified positional relationship (Step B4).

According to the seventh exemplary embodiment, it is possible to contribute to accurately (with a high precision) detecting a position of a detection object (mobile body 6). The reason resides in that it is possible to detect only the contour of the detection object (not shown) stably by masking the optical image information including brightness information having very little temporal fluctuation with the mask information created by using the map information, and a position of the detection object (not shown) can be detected with high precision.

The position detection apparatus according to the first to fifth and seventh exemplary embodiments and the remote control apparatus according to the sixth exemplary embodiment can be configured by so-called hardware resources (for example, information processing apparatus, computer). It is possible to use one comprising a configuration exemplarily shown in FIG. 14. For example, the hardware resources 100 comprise: a processor 101; a memory 102; a network interface 103; and the like, which are connected to each other by an internal bus 104.

Figure 14:
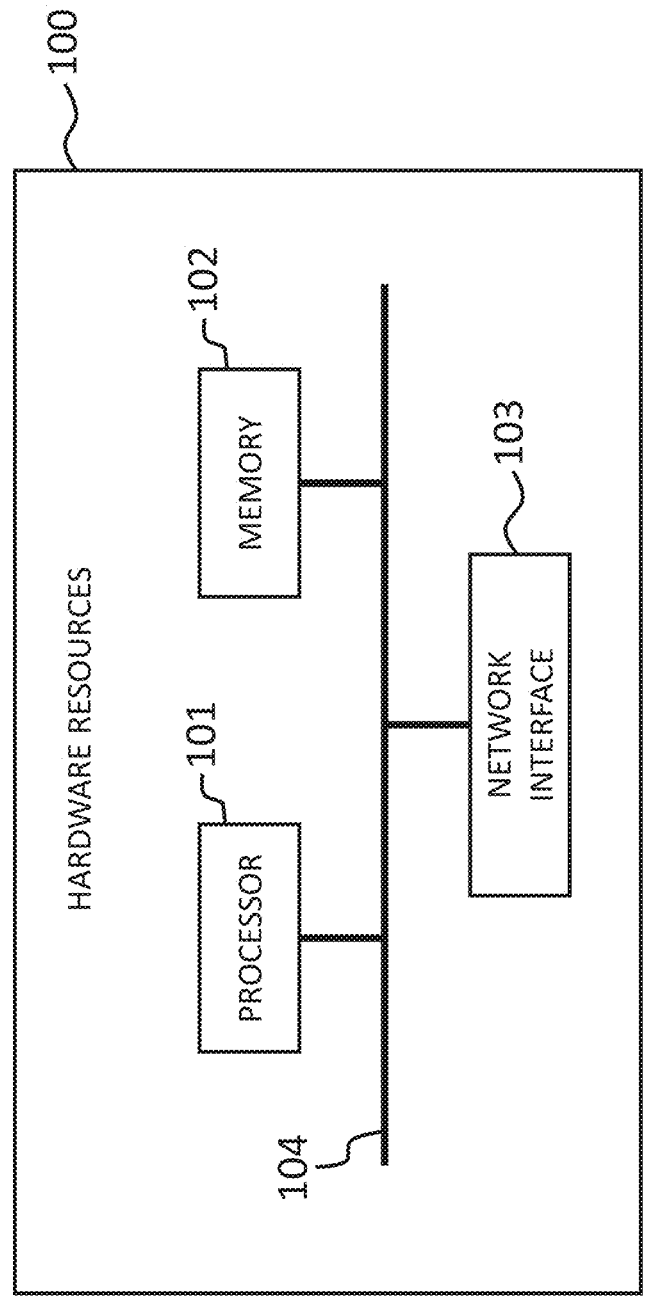
FIG. 14 is a block diagram schematically showing a configuration of hardware resources.

Note that the configuration shown in FIG. 14 is not intended to limit the hardware configuration of the hardware resources 100. The hardware resources 100 may comprise hardware (for example, an input/output interface) (not shown). Alternatively, the number of units such as the processor 101 included in an apparatus is not limited to the example of FIG. 14, and for example, a plurality of processors 101 may be comprised in an apparatus. For the processor 101, for example, a CPU (Central Processing part), an MPU (Micro Processor Unit), or the like can be used.

As the memory 102, for example, RAM (Random Access Memory), ROM (Read Only Memory), HDD (Hard Disk Drive), SSD (Solid State Drive) and the like can be used.

As the network interface 103, for example, a LAN (Local Area Network) card, a network adapter, a network interface card, or the like can be used.

A function of the hardware resources 100 is realized by the above-mentioned processing module. The processing module is realized, for example, by the processor 101 executing a program stored in the memory 102. Also, the program can be downloaded via a network or updated using a storage medium in which the program is stored. Further, the processing module may be realized by a semiconductor chip. That is, the function performed by the processing module may be realized by executing software on certain hardware.

Part or all of the above exemplary embodiments may be described as the following Modes, but is not limited to the following Modes.

[Mode 1]
In the present invention, a Mode of the position detection apparatus according to the first aspect is possible.

[Mode 2]
The position detection apparatus according to Mode 1, further comprising:
a detection object detection part that executes predetermined image processing to the partial optical image information, using the partial optical image information, and detects a contour of the detection object from the partial optical image information that has been subjected to the predetermined image processing; and a position detection part that detects a position of the contour of the detection object in the map information, using the map information and information related to the contour of the detection object.

[Mode 3]

The position detection apparatus according to Mode 1 or 2, wherein the map information creation part creates the map information, using information related to a distance measured by a distance sensor that measures a distance from the distance sensor itself to an entity-to-be-imaged including the detection object.

[Mode 4]

The position detection apparatus according to Mode 1 or 2, further comprising a map correction part that corrects the map information so that an angle of view by the imaging apparatus is vertically downward with respect to the map information, wherein the mask information creation part creates the mask information, using the map information corrected by the map correction part.

[Mode 5]

The position detection apparatus according to any one of Modes 1 to 4, further comprising an optical image correction part that corrects brightness or hue accompanying peripheral darkening in the optical image information, wherein the specifying part specifies the partial optical image information, using the optical image information corrected by the optical image correction part.

[Mode 6]

The position detection apparatus according to Mode 2, wherein the predetermined image processing in the detection object detection part comprises executing a binarization processing in which only pixels in a specific brightness range are set to "1" and other pixels are set to "0", with respect to the partial optical image information.

[Mode 7]

The position detection apparatus according to Mode 6, wherein the predetermined image processing in the detection object detection part comprises executing the binarization processing after executing an opening processing that the partial optical image information is contracted and then expanded, by the same number of times.

[Mode 8]

The position detection apparatus according to Mode 6, wherein the predetermined image processing in the detection object detection part comprises calculating a morphological gradient of the partial optical image information; extracting the contour of the detection object; and executing the binarization processing after painting the contour of the detection object in black.

[Mode 9]

In the present invention, a Mode of the position detection system according to the second aspect is possible.

[Mode 10]

The position detection system according to Mode 9, further comprising the distance sensor that measures a distance from the distance sensor itself to an entity-to-be-imaged including the detection object, wherein the distance sensor is communicatably connected to the position detection apparatus.

[Mode 11]

The position detection system according to Mode 9 or 10, wherein the imaging apparatus is a stereo camera.

[Mode 12]

In the present invention, a Mode of the remote control apparatus according to the third aspect is possible.

[Mode 13]

In the present invention, a Mode of the remote control system according to the fourth aspect is possible.

[Mode 14]

In the present invention, a Mode of the position detection method according to the fifth aspect is possible.

[Mode 15]

The position detection method according to Mode 14, wherein the detecting the position of the detection object further comprises:

executing a predetermined image processing onto the partial optical image information, using the partial optical image information and detecting a contour of the detection object from the partial optical image information that has been subjected to the predetermined image processing; and detecting a position of the contour of the detection object in the map information, using the map information and information related to the contour of the detection object.

[Mode 16]

In the present invention, a Mode of the program according to the sixth aspect is possible.

[Mode 17]

The program according to Mode 16, wherein in the detecting the position of the detection object, the hardware resources are caused to execute processings comprising: executing a predetermined image processing onto the partial optical image information, using the partial optical image information and detecting a contour of the detection object from the partial optical image information that has been subjected to the predetermined image processing; and detecting a position of the contour of the detection object in the map information, using the map information and information related to the contour of the detection object.

It should be noted that each disclosure of the above PTLs shall be incorporated and described herein by reference and can be used as a basis or a part of the present invention as necessary. Within a framework of the entire disclosure of the present invention (including claims and drawings), it is possible to modify or adjust the exemplary embodiments or examples based on the basic technical concept thereof. Also, within the framework of entire disclosure of the present invention, various combinations or selections (non-selection if necessary) of various disclosed elements (including each element of each claim, each element of each exemplary embodiment or example, each element of each drawing, etc.) is possible. That is, it goes without saying that the present invention includes various deformations and modifications that can be made by one skilled in the art in accordance with all disclosures including claims and drawings, and the technical concept. Further, as to the numerical values and numerical ranges described in the present application, it is considered that arbitrary intermediate values, lower numerical values, and small ranges are described even if not explicitly recited. Furthermore, it is also considered that a matter used to combine part or all of each of the disclosed matters of the above-cited documents with the matters described in this document as a part of the disclosure of the present invention, in accordance with the gist of the present invention, if necessary, is included in the disclosed matters of the present application.

REFERENCE SIGNS LIST

1 Position detection system
2 Position detection apparatus
3 Imaging apparatus
4 Remote control system
5 Remote control apparatus
6 Mobile body (detection object)
7 Network
8 Transport object
9 Distance sensor
10 Map information creation part
11 Mask information creation part
12 Specifying part
13 Detection object detection part
14 Position detection part
15 Map correction part
16 Optical image correction part
17 Detection part
30 Communication part
31 Control part
40 Communication part
41 Control part
42 Drive part
100 Hardware resources
101 Processor
102 Memory
103 Network interface
104 Internal bus

What is claimed is:

1. A position detection apparatus, comprising:
a memory having stored therein program instructions; and
a processor that when executing the program instructions to implement:
a map information creation part that creates map information representing a position in a space including a floor surface on which at least one detection object may be disposed, the position corresponding to each of pixels configuring optical image information representing an imaged image of at least the space, the optical image information being generated by an imaging apparatus imaging the space;
a mask information creation part that creates mask information, using map information, by extracting a region of a predetermined height range within a height range from the floor surface when the detection object is disposed in the space from the map information;
a specifying part that specifies partial optical image information, using the optical image information and the mask information, by removing a region corresponding to the mask information from the optical image information; and
a detection part that specifies a positional relationship between the map information and the partial optical image information at a pixel level, using the map information and the partial optical image information, and detects a position of the detection object in the map information based on the specified positional relationship.

2. The position detection apparatus according to claim 1, wherein the detection part comprises:
a detection object detection part that executes a predetermined image processing to the partial optical image information, using the partial optical image information, and detects a contour of the detection object from the partial optical image information that has been subjected to the predetermined image processing; and
a position detection part that detects a position of the contour of the detection object in the map information, using the map information and information related to the contour of the detection object.

3. The position detection apparatus according to claim 1, wherein the map information creation part creates the map information, using information related to a distance measured by a distance sensor that measures a distance from the distance sensor itself to an entity-to-be-imaged including the detection object.

4. The position detection apparatus according to claim 1, wherein the program instructions further implement a map correction part that corrects the map information so that an angle of view by the imaging apparatus is vertically downward with respect to the map information,
wherein the mask information creation part creates the mask information, using the map information corrected by the map correction part.

5. The position detection apparatus according claim 1, wherein the program instructions further implement an optical image correction part that corrects brightness or hue accompanying peripheral darkening in the optical image information,
wherein the specifying part specifies the partial optical image information, using the optical image information corrected by the optical image correction part.

6. The position detection apparatus according to claim 2, wherein the predetermined image processing in the detection object detection part comprises executing a binarization processing in which only pixels in a specific brightness range are set to "1" and other pixels are set to "0", with respect to the partial optical image information.

7. The position detection apparatus according to claim 6, wherein the predetermined image processing in the detection object detection part comprises:
calculating a morphological gradient of the partial optical image information;
extracting the contour of the detection object; and
executing the binarization processing after painting the contour of the detection object in black.

8. A remote control apparatus, comprising:
a position detection apparatus according to claim 1;
a communication part that enables communication with a mobile body and an imaging apparatus; and
a control part that controls an operation of the mobile body via the communication part based on information related to a position of the mobile body that is a detection object detected by the position detection apparatus.

9. A position detection method, comprising:
creating map information representing a position in a space including a floor surface on which at least one detection object may be disposed, the position corresponding to each of pixels configuring optical image information representing an imaged image of at least the space, the optical image information being generated by an imaging apparatus imaging the space;
creating mask information, using map information, by extracting, from the map information, a region of a predetermined height range within a height range from the floor surface when the detection object is disposed in the space;
specifying partial optical image information, using the optical image information and the mask information, by removing a region corresponding to the mask information from the optical image information; and specifying a positional relationship between the map information and the partial optical image information at a pixel level, using the map information and the partial optical image information, and detecting a position of the detection object in the map information based on the specified positional relationship.

10. A non-transient computer readable recording medium storing a program causing hardware resources to execute:

creating map information representing a position in a space including a floor surface on which at least one detection object may be disposed, the position corresponding to each of pixels configuring optical image information representing an imaged image of at least the space, the optical image information being generated by an imaging apparatus imaging the space;

creating mask information, using map information, by extracting, from the map information, a region of a predetermined height range within a height range from the floor surface when the detection object is disposed in the space;

specifying partial optical image information, using the optical image information and the mask information, by removing a region corresponding to the mask information from the optical image information; and specifying a positional relationship between the map information and the partial optical image information at a pixel level, using the map information and the partial optical image information, and detecting a position of the detection object in the map information based on the specified positional relationship.

11. The position detection apparatus according to claim 6, wherein the predetermined image processing in the detection object detection part comprises executing the binarization processing after executing an opening processing that the partial optical image information is contracted and then expanded, by the same number of times.

12. The position detection apparatus according to claim 6, wherein the predetermined image processing in the detection object detection part comprises calculating a morphological gradient of the partial optical image information; extracting the contour of the detection object; and executing the binarization processing after painting the contour of the detection object in black.

13. The position detection apparatus according to claim 1, wherein the map information creation part creates the map information, using the optical image information generated by the imaging apparatus.

14. The position detection apparatus according to claim 2, wherein the map information creation part creates the map information, using information related to a distance measured by a distance sensor that measures a distance from the distance sensor itself to an entity-to-be-imaged including the detection object.

15. The position detection apparatus according to claim 2, wherein the program instructions further implement a map correction part that corrects the map information so that an angle of view by the imaging apparatus is vertically downward with respect to the map information, wherein the mask information creation part creates the mask information, using the map information corrected by the map correction part.

16. The position detection apparatus according to claim 2, wherein the program instructions further implement an optical image correction part that corrects brightness or hue accompanying peripheral darkening in the optical image information, wherein the specifying part specifies the partial optical image information, using the optical image information corrected by the optical image correction part.

17. The position detection apparatus according to claim 3, wherein the program instructions further implement an optical image correction part that corrects brightness or hue accompanying peripheral darkening in the optical image information, wherein the specifying part specifies the partial optical image information, using the optical image information corrected by the optical image correction part.

18. The position detection apparatus according to claim 4, wherein the program instructions further implement an optical image correction part that corrects brightness or hue accompanying peripheral darkening in the optical image information, wherein the specifying part specifies the partial optical image information, using the optical image information corrected by the optical image correction part.

19. The position detection method according to claim 9, wherein the position detection method further comprises: executing a predetermined image processing to the partial optical image information, using the partial optical image information and detecting a contour of the detection object from the partial optical image information that has been subjected to the predetermined image processing; and detecting a position of the contour of the detection object in the map information, using the map information and information related to the contour of the detection object.

20. The non-transient computer readable recording medium according to claim 10, wherein the program causes hardware resources to execute further executing a predetermined image processing to the partial optical image information, using the partial optical image information and detecting a contour of the detection object from the partial optical image information that has been subjected to the predetermined image processing; and detecting a position of the contour of the detection object in the map information, using the map information and information related to the contour of the detection object.

* * * * *